United States Patent
Sridharan et al.

(10) Patent No.: US 11,696,283 B2
(45) Date of Patent: Jul. 4, 2023

(54) IMPACT OF PRIORITY-SPECIFIC BETA FACTORS ON UPLINK POWER CONTROL

(71) Applicant: QUALCOMM Incorporated, San Diego, CA (US)

(72) Inventors: Gokul Sridharan, Sunnyvale, CA (US); Seyedkianoush Hosseini, San Diego, CA (US); Wei Yang, San Diego, CA (US); Yi Huang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/322,378

(22) Filed: May 17, 2021

(65) Prior Publication Data

US 2022/0369334 A1 Nov. 17, 2022

(51) Int. Cl.
*H04W 72/10* (2009.01)
*H04W 72/1268* (2023.01)
*H04W 52/14* (2009.01)

(52) U.S. Cl.
CPC ..... *H04W 72/1268* (2013.01); *H04W 52/146* (2013.01)

(58) Field of Classification Search
CPC ..... H04W 72/10; H04W 76/27; H04W 80/02; H04W 80/08; H04W 28/00; H04W 52/32; H04W 72/04; H04L 27/28
See application file for complete search history.

(56) References Cited

U.S. PATENT DOCUMENTS

2014/0192738 A1 7/2014 Nam et al.
2019/0313419 A1 10/2019 Fakoorian et al.
(Continued)

FOREIGN PATENT DOCUMENTS

EP 3232595 A1 10/2017
WO 2021009345 A1 1/2021

OTHER PUBLICATIONS

Partial International Search Report—PCT/US2022/071715—ISA/EPO—dated Jul. 25, 2022.
(Continued)

*Primary Examiner* — Tu X Nguyen
(74) *Attorney, Agent, or Firm* — Patterson + Sheridan, L.L.P.

(57) ABSTRACT

Aspects of the present disclosure relate to wireless communications, and more particularly, to techniques for managing uplink power control in accordance with priority-specific beta factors. An example method for wireless communication performed by a user equipment (UE) generally includes determining a value of a beta factor based on a priority level of uplink control information (UCI) to be transmitted on a physical uplink shared channel (PUSCH); and transmitting the UCI on the PUSCH with transmit power determined based, at least in part, on the value of beta factor. Another example method performed by a UE generally includes deciding, when the UE is configured to perform demodulation reference signal (DMRS) bundling across PUSCH repetitions, whether to prioritize the DMRS bundling or transmission of UCI multiplexed in one of the PUSCH repetitions; and transmitting the PUSCH repetition with the multiplexed UCI in accordance with the decision.

27 Claims, 20 Drawing Sheets

(56) References Cited

U.S. PATENT DOCUMENTS

2022/0183025 A1* 6/2022 Fröberg Olsson .... H04L 5/0007
2022/0191882 A1* 6/2022 Lee ...................... H04L 1/1854

OTHER PUBLICATIONS

Qualcomm Incorporated: "Joint Channel Estimation for PUSCH", 3GPP TSG-RAN WG1 Meeting #105e, R1-2104687, 3GPP, Mobile Competence Centre, 650, Route Des Lucioles, F-06921, Sophia-Antipolis Cedex, France, vol. RAN WG1, No. e-Meeting, May 10-27, 2021, May 12, 2021, XP052010938, 9 Pages, URL: https://ftp.3gpp.org/tsg_ran/WG1_RL1/TSGR1_105-e/Docs/R1-2104687.zip R1-2104687 Joint channel estimation for PUSCH.docx.

* cited by examiner

Table: RRC configured beta_offset in UCI_onPUSCH parameters

| Beta_offset index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| 0 | A | B | C | D | E | F | G |
| 1 | A' | B' | C' | D' | E' | F' | G' |
| 2 | A'' | B'' | C'' | D'' | E'' | F'' | G'' |
| 3 | A''' | B''' | C''' | D''' | E''' | F''' | G''' |

500 ←

↑ beta_offset indicator

FIG. 5

follow, some features will now be discussed briefly. After
IMPACT OF PRIORITY-SPECIFIC BETA FACTORS ON UPLINK POWER CONTROL

BACKGROUND

Field of the Disclosure

Aspects of the present disclosure relate to wireless communications, and more particularly, to techniques for managing uplink power control based on priority-specific beta factors.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for managing uplink power control in accordance with priority-specific beta factors.

Certain aspects provide a method of wireless communications by a user equipment (UE). The method generally includes determining a value of a beta factor based on a priority level of uplink control information (UCI) to be transmitted on a physical uplink shared channel (PUSCH); and transmitting the UCI on the PUSCH with transmit power determined based, at least in part, on the value of beta factor.

Certain aspects provide an apparatus for wireless communications by a UE. The apparatus generally includes at least one processor and a memory configured to determine a value of a beta factor based on a priority level of UCI to be transmitted on a PUSCH; and transmit the UCI on the PUSCH with transmit power determined based, at least in part, on the value of beta factor.

Certain aspects provide an apparatus for wireless communications. The apparatus generally includes means for determining a value of a beta factor based on a priority level of UCI to be transmitted on a PUSCH; and means for transmitting the UCI on the PUSCH with transmit power determined based, at least in part, on the value of beta factor.

Certain aspects of the subject matter described in this disclosure can be implemented in a computer readable medium storing computer executable code thereon for wireless communications. The computer readable medium comprises code for determining a value of a beta factor based on a priority level of UCI to be transmitted on a PUSCH; and transmitting the UCI on the PUSCH with transmit power determined based, at least in part, on the value of beta factor.

Certain aspects provide a method of wireless communications by a network entity. The method generally includes configuring a UE with different tables of beta factor values, each of the tables associated with a different combination of priority levels for UCI and PUSCH transmissions; and processing UCI multiplexed in a PUSCH transmitted from the UE with transmit power determined using a beta factor value from one of the different tables.

Certain aspects provide an apparatus for wireless communications by a network entity. The apparatus generally includes at least one processor and a memory configured to configure a UE with different tables of beta factor values, each of the tables associated with a different combination of priority levels for UCI and PUSCH transmissions; and process UCI multiplexed in a PUSCH transmitted from the UE with transmit power determined using a beta factor value from one of the different tables Certain aspects provide an apparatus for wireless communications. The apparatus generally includes means for configuring a UE with different tables of beta factor values, each of the tables associated with a different combination of priority levels for UCI and PUSCH transmissions; and means for processing UCI multiplexed in a PUSCH transmitted from the UE with transmit power determined using a beta factor value from one of the different tables.

Certain aspects of the subject matter described in this disclosure can be implemented in a computer readable medium storing computer executable code thereon for wireless communications. The computer readable medium comprises code for configuring a UE with different tables of beta factor values, each of the tables associated with a different combination of priority levels for UCI and PUSCH transmissions; and processing UCI multiplexed in a PUSCH transmitted from the UE with transmit power determined using a beta factor value from one of the different tables.

Certain aspects provide a method of wireless communications by a user equipment (UE). The method generally includes deciding, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and transmitting the PUSCH repetition with the multiplexed UCI in accordance with the decision.

Certain aspects provide an apparatus for wireless communications by a UE. The apparatus generally includes at least one processor and a memory configured to decide, when the UE is configured to perform demodulation reference signal (DMRS) bundling across PUSCH repetitions, whether to prioritize the DMRS bundling or transmission of UCI multiplexed in one of the PUSCH repetitions; and transmit the PUSCH repetition with the multiplexed UCI in accordance with the decision.

Certain aspects provide an apparatus for wireless communications. The apparatus generally includes means for deciding, when the UE is configured to perform DMRS bundling across PUSCH repetitions, whether to prioritize the DMRS bundling or transmission of UCI multiplexed in one of the PUSCH repetitions; and means for transmitting the PUSCH repetition with the multiplexed UCI in accordance with the decision.

Certain aspects of the subject matter described in this disclosure can be implemented in a computer readable medium storing computer executable code thereon for wireless communications. The computer readable medium comprises code for deciding, when the UE is configured to perform DMRS bundling across PUSCH repetitions, whether to prioritize the DMRS bundling or transmission of UCI multiplexed in one of the PUSCH repetitions; and transmitting the PUSCH repetition with the multiplexed UCI in accordance with the decision.

Certain aspects provide a method of wireless communications by a network entity. The method generally includes configuring a UE to perform DMRS bundling across PUSCH repetitions; determining whether the UE is to prioritize the DMRS bundling or transmission of UCI multiplexed in one of the PUSCH repetitions; and processing the PUSCH repetitions in accordance with the determination.

Certain aspects provide an apparatus for wireless communications by a network entity. The apparatus generally includes at least one processor and a memory configured to configure a UE to perform DMRS bundling across PUSCH repetitions; determine whether the UE is to prioritize the DMRS bundling or transmission of UCI multiplexed in one of the PUSCH repetitions; and process the PUSCH repetitions in accordance with the determination.

Certain aspects provide an apparatus for wireless communications. The apparatus generally includes means for configuring a UE to perform DMRS bundling across PUSCH repetitions; means for determining whether the UE is to prioritize the DMRS bundling or transmission of UCI multiplexed in one of the PUSCH repetitions; and means for processing the PUSCH repetitions in accordance with the determination.

Certain aspects of the subject matter described in this disclosure can be implemented in a computer readable medium storing computer executable code thereon for wireless communications. The computer readable medium comprises code for configuring a UE to perform DMRS bundling across PUSCH repetitions; determining whether the UE is to prioritize the DMRS bundling or transmission of UCI multiplexed in one of the PUSCH repetitions; and processing the PUSCH repetitions in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a table illustrating various beta offsets based on a beta offset index and uplink transmission parameters, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
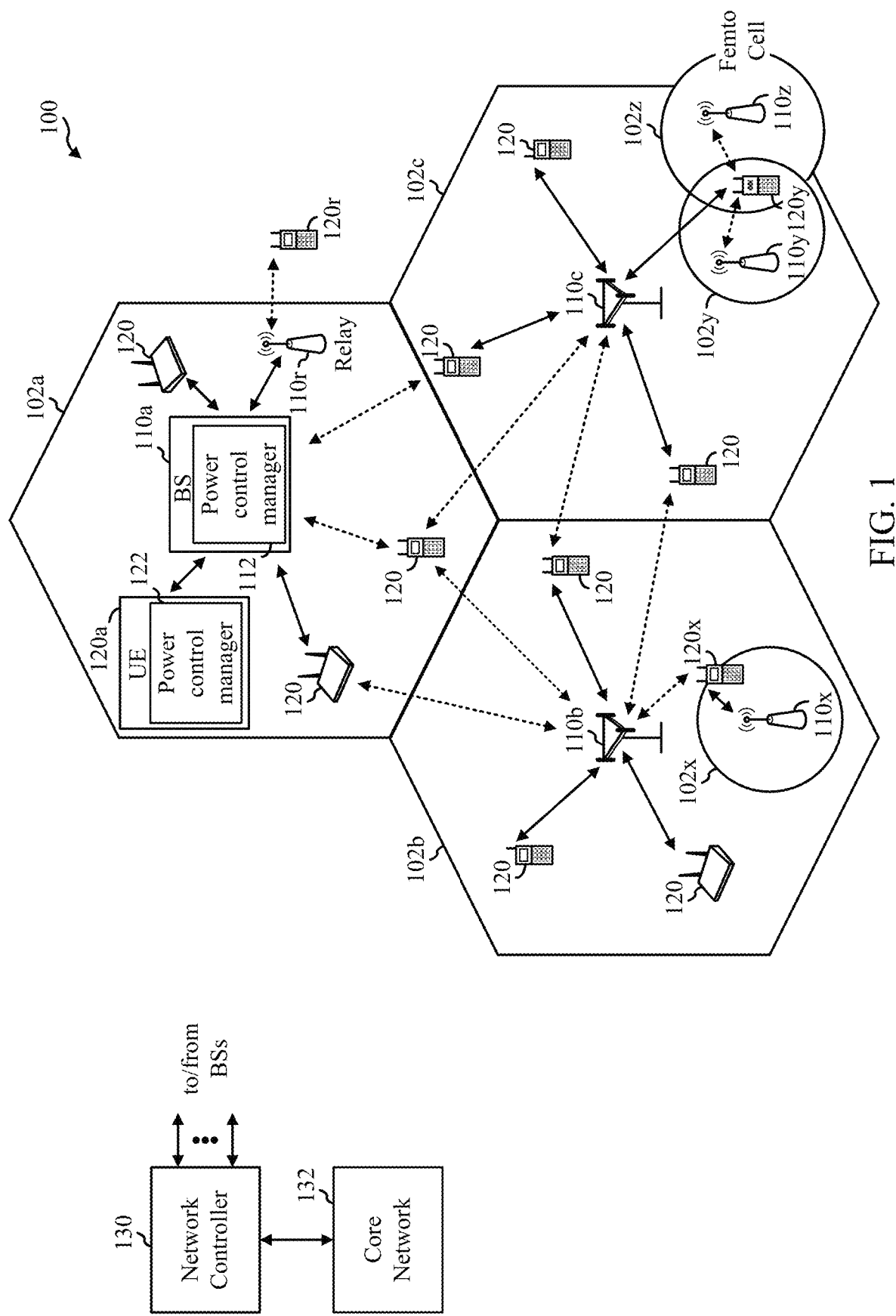
FIG. 1 is a block diagram conceptually illustrating an example wireless communication network, in accordance with certain aspects of the present disclosure.

Aspects of the present disclosure provide apparatuses, methods, processing systems, and computer readable mediums for managing uplink power control in accordance with priority-specific beta factors. A beta factor generally refers to a parameter currently used to determine resource splitting between an uplink shared channel (UL-SCH) and uplink control information (UCI). For example, the beta factor value may be chosen to increase (boost) the time/frequency resources used for transmitting UCI and enhance its reliability.

Beta factor values currently do not have an impact on transmit power. This is because currently, whenever there is data to be transmitted on a physical uplink shared channel (PUSCH), a beta offset may be set to 1 when computing transmit power regardless of whether UCI is multiplexed.

Aspects of the present disclosure, however, propose a new priority-specific beta to be used to alter transmit power. In other words, in addition to using a beta factor value to boost resources used for transmitting UCI, transmit power control could also be impacted by the selection of beta factors. As will be described below, beta factor values may be selected based on priority of UCI and, based on the selected value, additional power could be employed towards the transmission of UCI on PUSCH.

The following description provides examples of managing uplink power control in accordance with priority-specific beta factors in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing uplink power control in accordance with priority-specific beta factors repetitions. As shown in FIG. 1, a UE 120a includes a power control manager 122 configured to perform operations 1100 of FIG. 11, operations 1300 of FIG. 13, and/or operations 1500 of FIG. 15, and a BS 110a includes a power control manager 112 configured to perform operations 1200 of FIG. 12 and/or operations 1600 of FIG. 16.

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
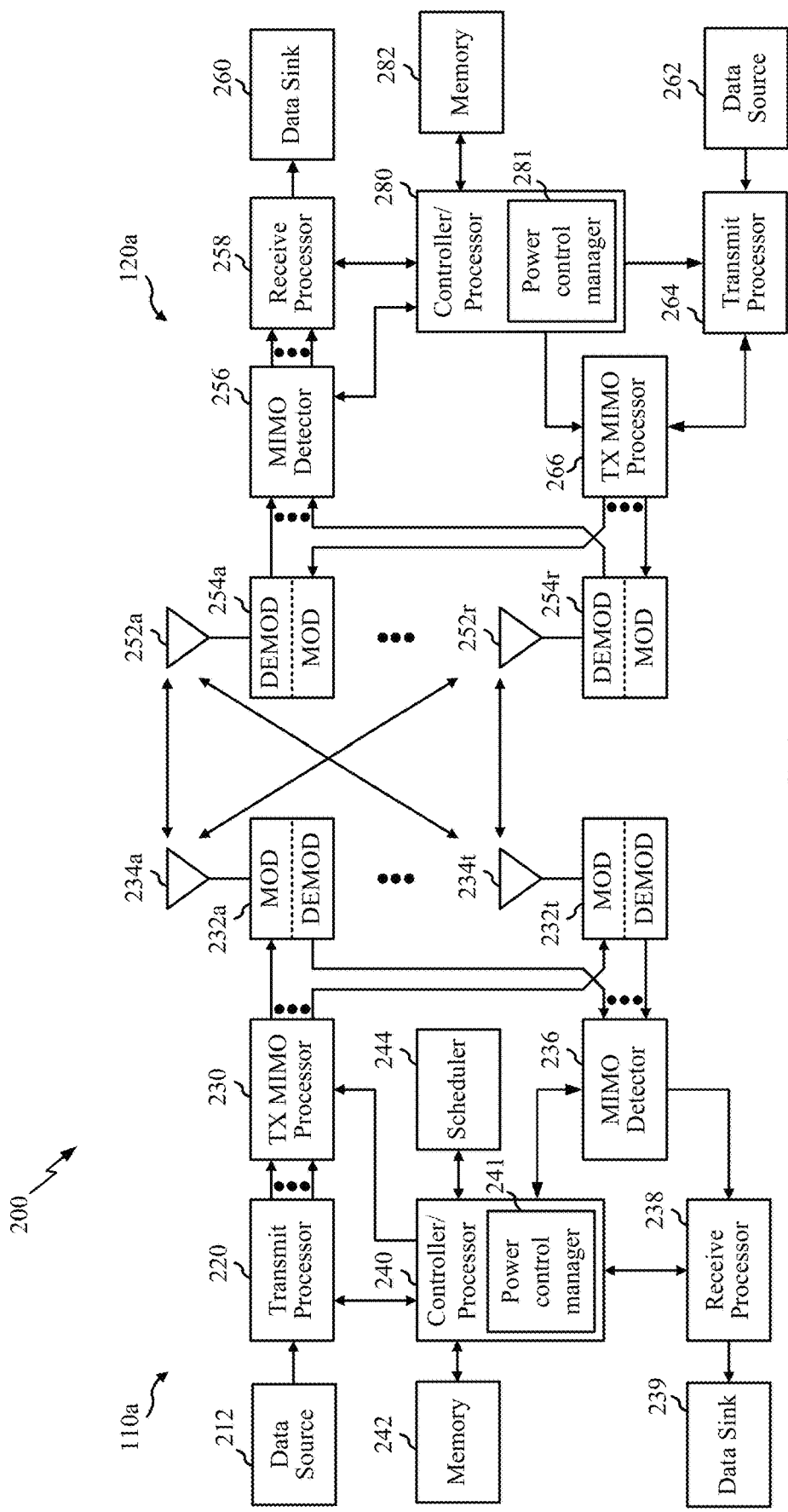
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a power control manager 241 that may be configured to perform the operations 1200 of FIG. 12 and/or operations 1600 of FIG. 16, as well as other operations disclosed herein. As shown in FIG. 2, the controller/processor 280 of the UE 120a has a power control manager 281 that may be configured to perform the operations 1100 of FIG. 11, operations 1300 of FIG. 13, and/or operations 1500 of FIG. 15, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
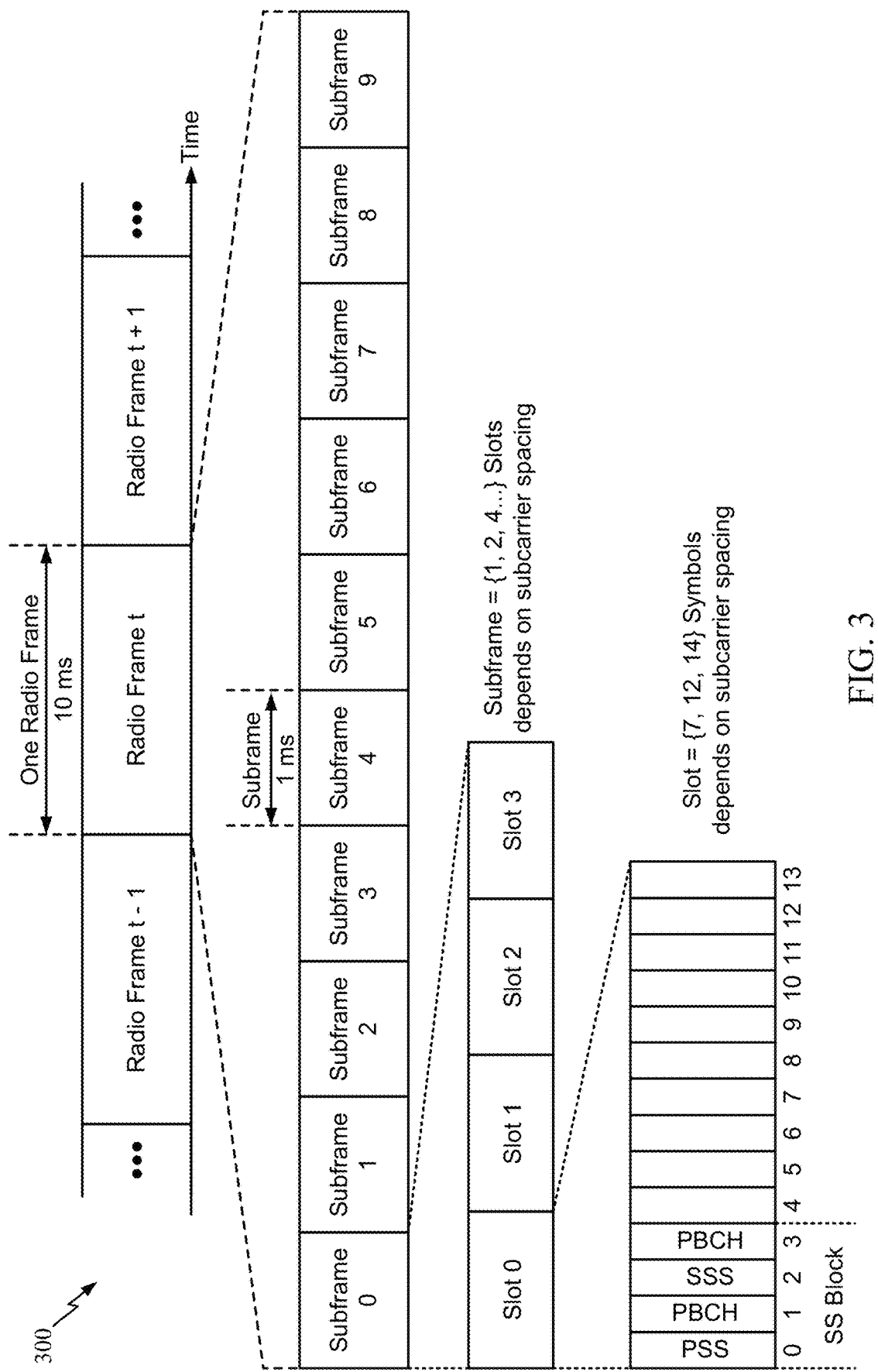
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Uplink Power Control Considerations

Power control generally refers to a mechanism for varying transmit power in accordance with varying channel conditions (e.g., to achieve a desired data rate). As the battery of a UE is typically power limited compared to base station power, uplink power control is an important mechanism to limit intra-cell and inter-cell interference and to reduce UE power consumption.

Uplink power control is generally a combination of open loop power control (OLPC) and closed loop power control (CLPC) mechanisms. OLPC generally refers to the ability of a UE transmitter to sets its output power to a specific value to compensate for increases in path loss (PL). CLPC is based on feedback from a base station (BS) to the UE, in the form of a transmit power control command (TPC). Based on the TPC, a UE will either increase or decrease its power as instructed.

For a physical uplink shared channel (PUSCH) transmission, an open loop power control equation (for a given subframe i) may be defined as:

$$P_{OPEN\_LOOP\_PUSCH} = \min\{Pc\ \max, 10 \times LOG(M_{PUSCH}(i)) + P_{O\_PUSCH}(i) + [PL \times \alpha(i)] + \Delta_{TF}(i)$$

where Pcmax is a specified UE maximum transmit power, P0 is a target received power, PL is the downlink path loss calculated by the UE as a combination of reference signal received power (RSRP) measurements and knowledge of the reference signal transmit power, and a is a factor used to configure the use of fractional power control.

$\Delta_{TF}(i)$ relates to the modulation and coding scheme (MCS) and generally serves to increase the UE transmit power when transferring a large number of bits per Resource Element. This links the UE transmit power to the Modulation and Coding Scheme (MCS). The number of bits per Resource Element is high when using 64 quadrature amplitude modulation (QAM) and a large transport block size. The number of bits per Resource Element is low when using quadrature phase shift keying (QPSK) and a small transport block size. Increasing the UE transmit power helps to achieve the signal-to-interference-plus-noise ratio (SINR) requirements associated with higher order modulation schemes and high coding rates.

In some cases, certain UL OLPC parameters, such as P0 and α may be signaled dynamically, via DCI. In some cases, different combinations of values for P0 and α may be configured (e.g., via RRC signaling) and a particular combination may be signaled via a DCI OLPC field.

Example Managing Uplink Power Control in Accordance with Priority-Specific Beta Factors Certain aspects of the present disclosure provide techniques for managing uplink (UL) power control in accordance with priority-specific beta factors. As will be described in greater detail below, in addition to using a beta factor value to boost resources used for transmitting UCI, transmit power control could also be impacted by the selection of the beta factor value. For example, beta factor values may be selected based on priority of UCI and, based on the selected value, additional power could be employed towards the transmission of UCI on PUSCH.

In certain systems, such as Release 17 systems that support different types of traffic, such as ultra-reliable low latency communication (URLLC) industrial internet-of-things (IIoT) traffic, separate beta factors for UL control information (UCI) multiplexing based on priority may be enabled. As noted above, beta factors currently determine resource splitting between UL data channels (e.g., an UL shared channel (SCH) such as a physical UL shared channel (PUSCH)) and UCI, without having an impact on transmit power when there is uplink date to be transmitted.

According to certain aspects of the present disclosure, however, a priority-specific beta factor could be used to alter transmit power to temporarily transmit a PUSCH (e.g., carrying high priority hybrid automatic repeat request (HARD) acknowledgement (ACK) information) to be transmitted at a higher power.

Aspects of the present disclosure provide various signaling mechanisms for selecting beta factor values, when beta factor values are allowed to impact transmit power. Aspects of the present disclosure also provide mechanisms for handling demodulated reference signal (DMRS) bundling when transmit power is altered in different PUSCH repetitions (e.g., due to priority-based beta factor values).

Figure 4:
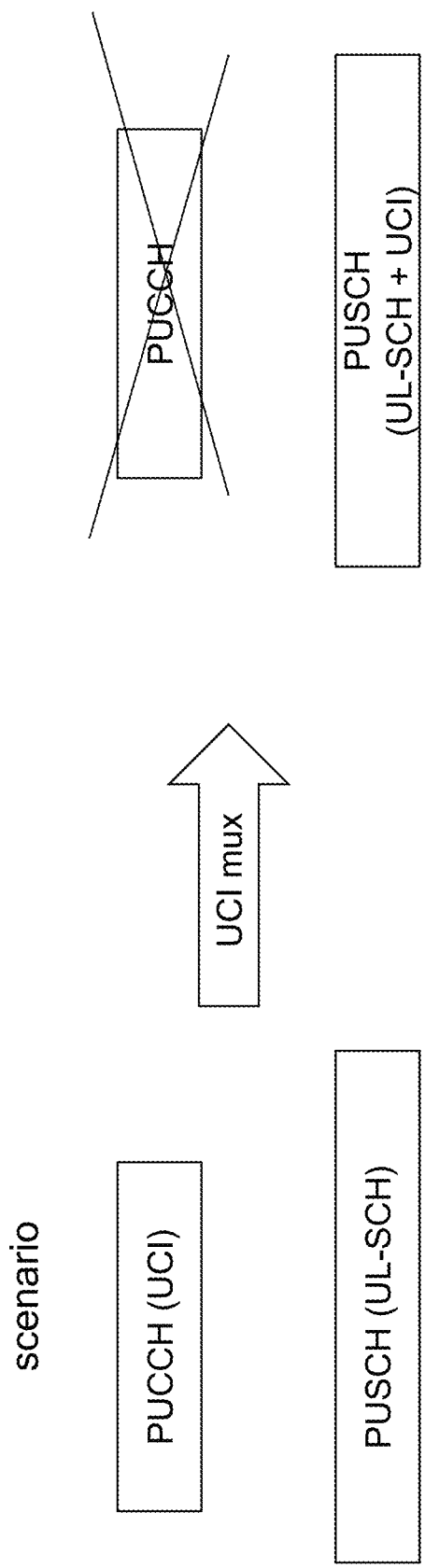
FIG. 4 is a conceptual diagram illustrating uplink control information (UCI) multiplexed with an uplink data channel, in accordance with certain aspects of the present disclosure.

FIG. 4 is a conceptual diagram illustrating how UCI may be multiplexed with an UL data channel, in accordance with certain aspects of the present disclosure.

As illustrated, UCI multiplexing on PUSCH may occur when a physical uplink control channel (PUCCH) scheduled to carry UCI overlaps (e.g., in the time domain) with a PUSCH. In this case, the PUCCH transmission may dropped and the UCI may be multiplexed on the PUSCH so that the PUSCH channel now carries data and UCI (UL−SCH+UCI).

As noted above, a beta offset is a factor used to scale down the spectrum efficiency of UCI (with respect to the spectrum efficiency of data) when the UCI is multiplexed on PUSCH to provide higher reliability for the UCI. For example, assuming UCI content is HARQ-ACK, using the equation below:

$$Q'_{ACK} =$$

-continued $$\min\left\{\left\lceil\frac{(O_{ACK} + L_{ACK}) * \beta_{offset}^{PUSCH} * \sum_{l=0}^{N_{symb,all}^{PUSCH}} M_{SC}^{UCI}(l)}{\sum_{r=0}^{C_{UL-SCH}-1} K_r}\right\rceil, \left\lceil\alpha \sum_{l=l_0}^{N_{symb,all}^{PUSCH}-1} M_{SC}^{UCI}(l)\right\rceil\right\}$$

the number of reference elements (REs) assigned to HARQ-ACK (e.g., $Q'_{ACK}$) when HARQ-ACK is multiplexed on PUSCH can be boosted. If the beta offset $\beta_{offset}^{PUSCH}$ is used to boost resources, the larger the beta offset value is, the lower the UCI spectral efficiency is. Consequently, the lower the UCI spectrum efficiency is, the greater number of REs are UCI taken up by in the PUSCH, and the more reliable UCI transmission is, which may ultimately has a larger impact on PUSCH performance overall.

FIG. 5 is a table 500 illustrating various beta offsets based on a beta offset index and UCI content and payload size, in accordance with certain aspects of the present disclosure.

As shown, to support dynamic beta offset indication, a network entity (e.g., a gNB) can configure a UE with a number of entries/rows (e.g., four in this example). Each entry has a set of candidate beta offset value(s) for different UCI types (e.g., HARQ-ACK (with various numbers of bits), CSI_part1, CSI_part2) and payload sizes (e.g., <=2 bits, 3-11 bits, or >11 bits). In an UL grant (e.g., downlink control information (DCI) format 0_1), a 2-bit field (e.g., a beta offset indicator) can be used to indicate to the UE which table entry to use. This is illustrated in the first column of the table 500, with beta offset index values ranging from 0 (binary 00) to 3 (binary 11).

As noted above, certain systems (e.g., Release 17) may support UCI multiplexing on PUSCH with different priorities, for example where UCI and PUSCH (data) have different priorities. Four multiplexing scenarios exist due to different combination of priorities for UCI and PUSCH: 1) the UCI may be low priority and the PUSCH may be low priority; 2) the UCI may be high priority and the PUSCH may be low priority; 3) the UCI may be low priority and the PUSCH may be high priority; and 4) the UCI may be high priority and the PUSCH may be high priority.

To support these different combinations of UCI and PUSCH priorities, according to certain aspects of the present disclosure, a gNB may configure a UE with four different tables of beta offset values. In other words, for each of the different combinations of priorities, a table similar to table 500 of FIG. 5 may be provided.

In general, the beta offset determination can be done in two steps. In a first step, based on the indicated priority level of UCI and PUSCH (e.g., via DCI and/or radio resource control (RRC) signaling), the UE could determine which table to use. In a second step, the gNB may still use 2 bits in UL DCI to indicate which entry to use in the determined table. The UE could then select the appropriate beta factor values from that entry (e.g., based on the UCI type and payload size).

Figure 6:
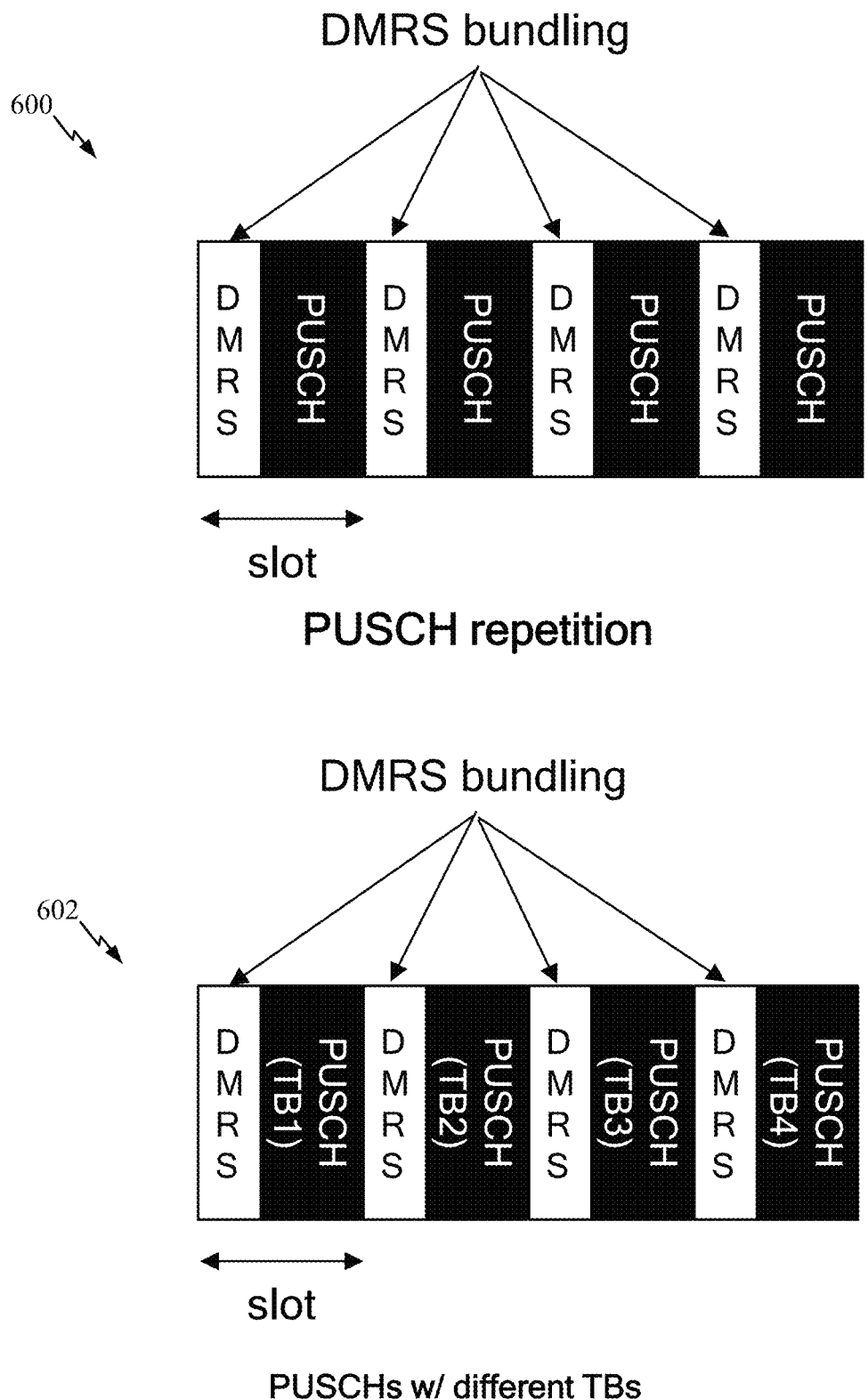
FIG. 6 illustrates example scenarios of demodulated reference signal (DMRS) bundling, in accordance with certain aspects of the present disclosure.

In some cases, as illustrated in FIG. 6, DMRS bundling may be enabled across PUSCH repetitions. In DMRS bundling, a same or coherent DMRS is sent in multiple time slots, which may enhance coverage, allowing a base station to consider multiple DMRS when performing channel estimation. The enhanced channel estimating may further improve the chances of successful decoding of the uplink transmission.

As shown, PUSCH/PUCCH DMRS bundling may be applied to a PUSCH repetition over multiple PUSCH repetitions carrying a same transport blocks (TB) as shown in diagram 600 or carrying different TBs as shown in diagram 602. PUSCH DMRS bundling typically relies on phase continuity across PUSCH symbols. However, phase continuity need not be a prerequisite if the gNB can compensate for phase errors. In certain aspects, the two modes of operation shown in FIG. 6 may be distinguished.

Phase discontinuity may arise based on non-contiguous (time) resource allocation. Phase discontinuity may also arise when a timing gap between PUSCH symbols is larger a threshold, and/or when other UL channels/signals (e.g., PUCCH, sounding reference signals (SRS) etc.) or DL channels/signals (e.g., PDCCH, PDSCH, synchronization signal block (SSB), channel state information (CSI) reference signals (RS), etc.) are sent during the gap. Phase discontinuity may further arise when different frequency resource allocations are configured for PUSCH symbols, different transmit power, and/or different transmit waveform.

Figure 7:
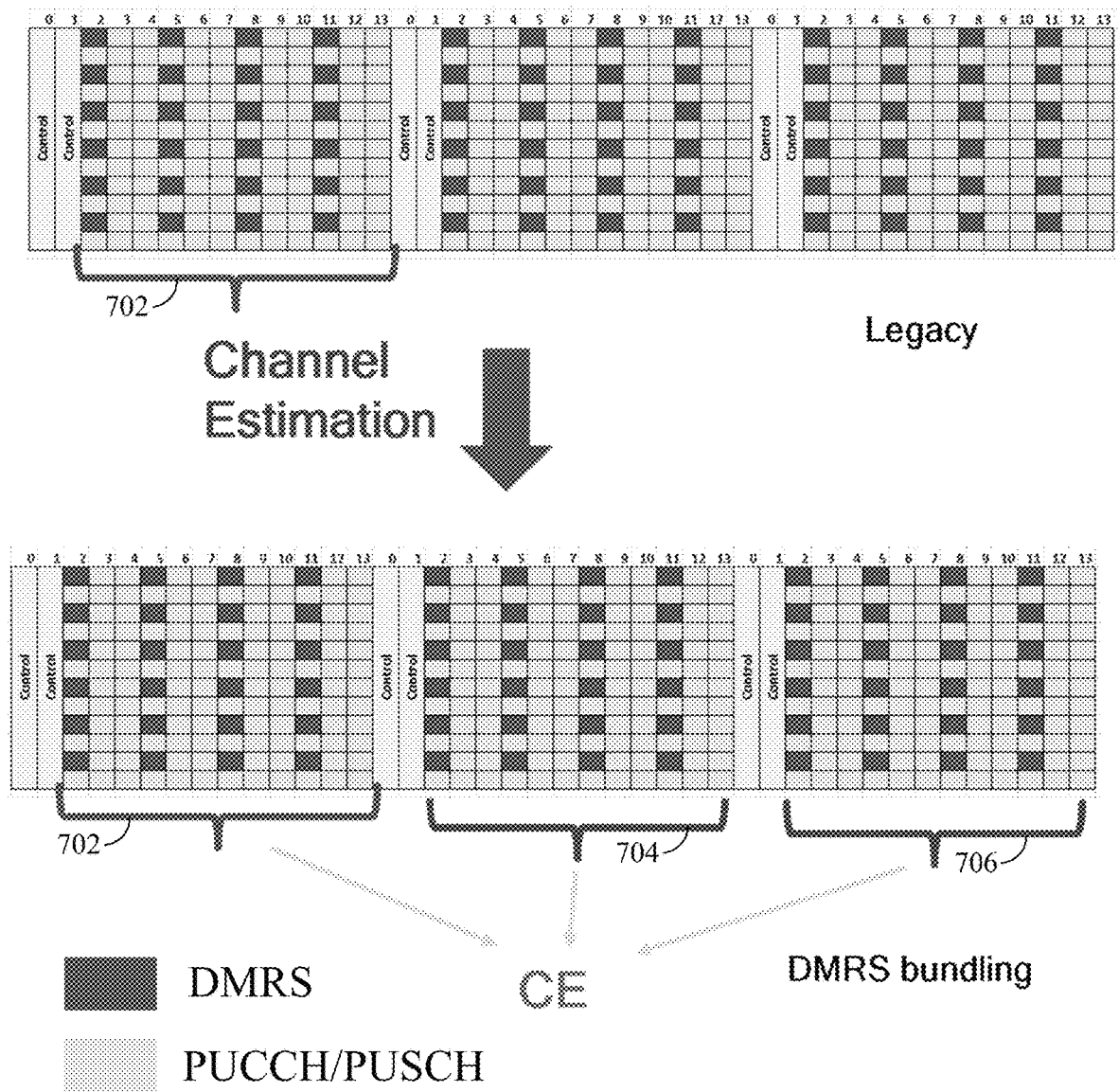
FIG. 7 illustrates example DMRS bundling in accordance with DMRS bundling principles, in accordance with certain aspects of the present disclosure.

FIG. 7 illustrates how DMRS bundling may be used to enhance channel estimation. As shown in the subframe 702, the receiving device (e.g., a gNB) jointly processes DMRS in multiple PUCCH/PUSCH transmissions, and channel estimation can be performed. As shown in the subframes 704 and 706, ideally, the transmitting device maintains phase coherence across multiple PUCCH/PUSCH transmissions.

Figure 8:
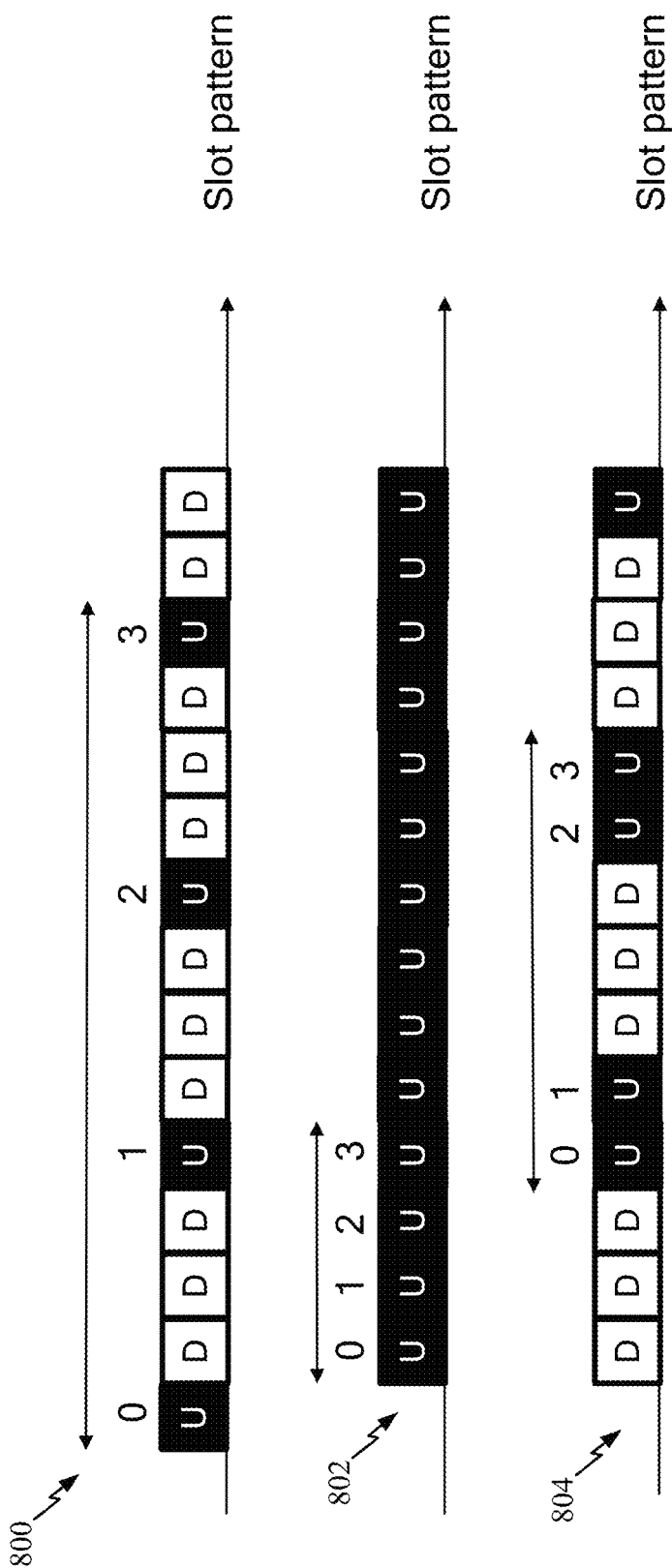
FIG. 8 illustrates example timelines of different DMRS bundling implementations, in accordance with certain aspects of the present disclosure.

FIG. 8 illustrates timelines for different patterns of different DMRS bundling across multiple slots. As shown in each of the timelines 800, 802, and 804, DMRS bundling across PUSCH/PUCCH repetitions (e.g., in time division duplexed (TDD) and/or frequency division duplexed (FDD) bands) may be performed in a variety of ways. In the cases shown, the span of repetitions may depend on the slot pattern and how symbols are to be used (e.g., uplink, downlink, or flexible).

Figure 9:
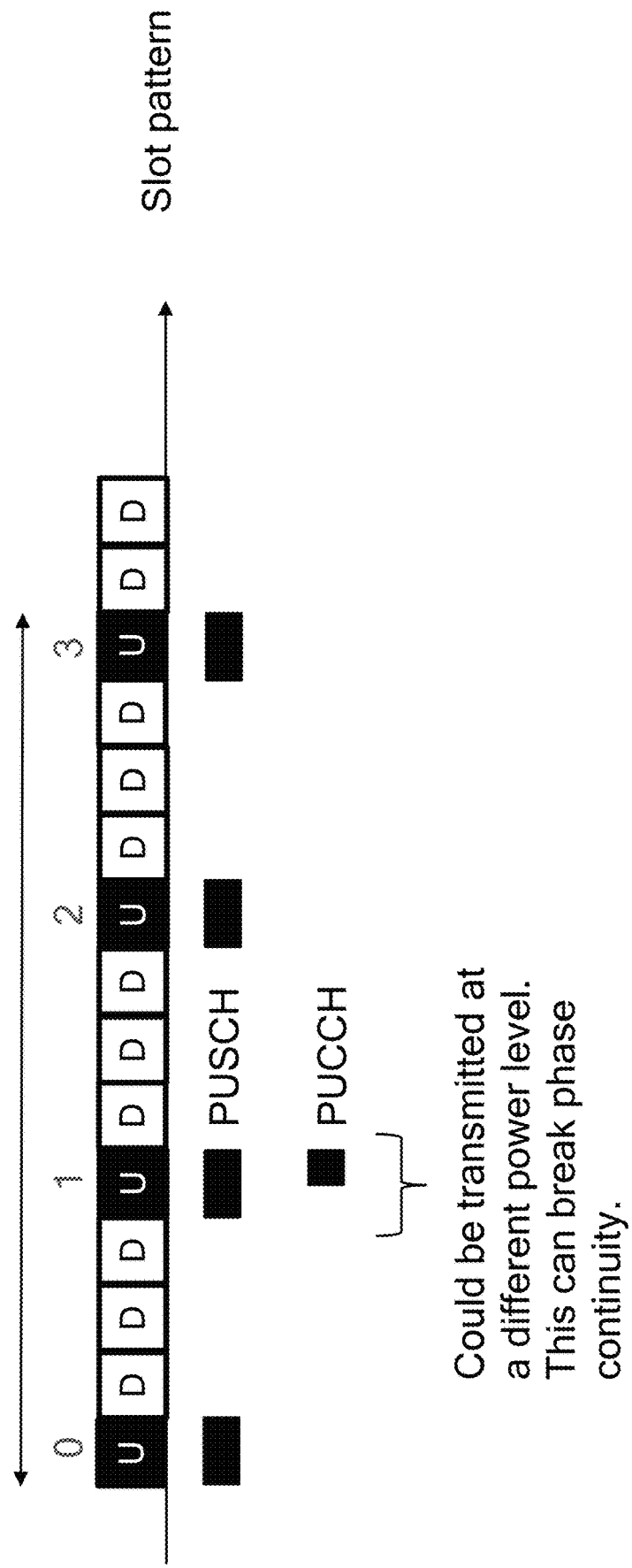
FIG. 9 illustrates an example timeline of multiplexing UCI and an uplink data channel while bundling DMRS, in accordance with certain aspects of the present disclosure.

As illustrated in FIG. 9, however, if transmit power is changed across slots (e.g., by using a different beta factor value when UCI is multiplexed with PUSCH), DMRS phase continuity may be broken. In the illustrated example, PUSCH repetition 1 is transmitted at a different power level than PUSCH repetitions 0, 2, and 3, which can break phase continuity.

Figures 10A, 10B:
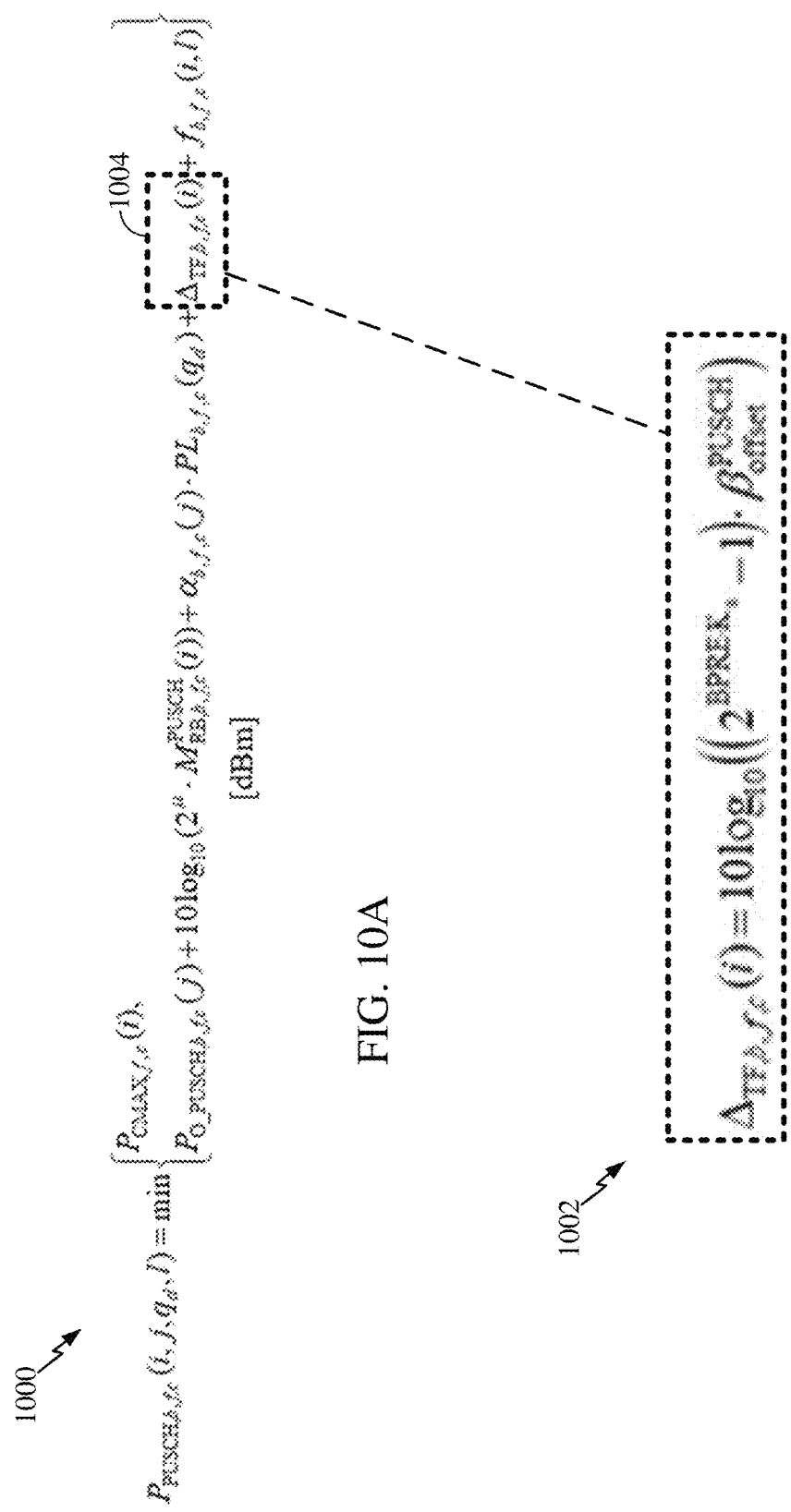
FIGS. 10A and 10B show example equations used to determine uplink power, in accordance with certain aspects of the present disclosure.

The equations of FIGS. 10A and 10B demonstrate how power control can be impacted by the choice of beta factor. Taking both equations 1000 and 1002 into account, the use of the beta factor can boost resources used towards UCI and enhance its reliability since the delta function 1004 of the equation 1000 is directly influenced by the beta factor shown in equation 1002. Thus, power control can be impacted by the choice of beta factor. Therefore, based on priority of UCI and the value of beta factor, additional power could be employed towards the transmission of UCI on PUSCH.

As noted above, certain aspects of the present disclosure are directed toward use of a priority-specific beta factor when multiplexing UCI with UL data on an UL data channel. In existing power control schemes, the different parameters of the power control equations are set such that beta factor values are not allowed to impact transmit power control. For example, whenever there is data to be transmitted on PUSCH, beta-offset is set to 1 when computing transmit power regardless of whether UCI is multiplexed or not. Aspects of the present disclosure modify this scheme, for example, so that even when data is present and UCI is multiplexed with PUSCH, a beta factor may be chosen to be a value greater than 1 when computing the transmit power.

Figure 11:
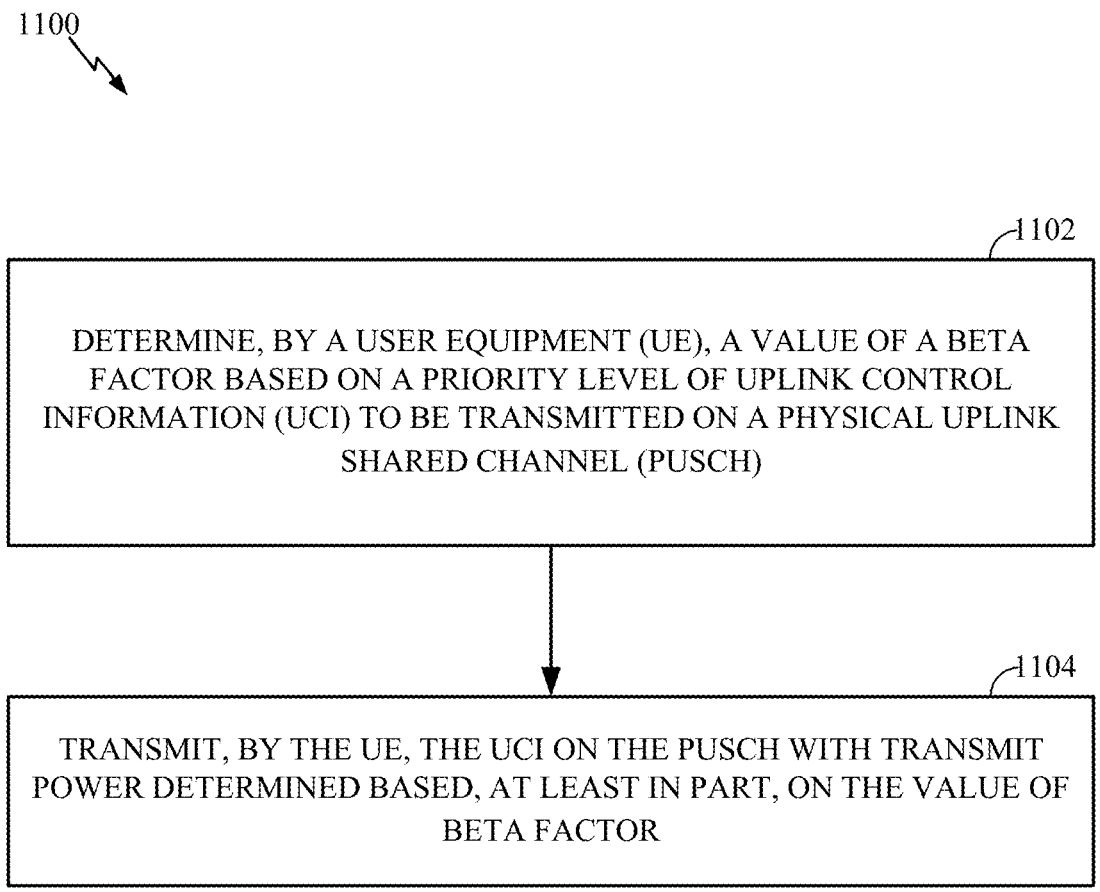
FIG. 11 is a flow diagram illustrating example operations for wireless communication by a UE, in accordance with certain aspects of the present disclosure.

FIG. 11 is a flow diagram illustrating example operations 1100 for wireless communication by a UE, in accordance with certain aspects of the present disclosure. The operations 1100 may be performed, for example, by the UE 120a in the wireless communication network 100. The operations 1100 may be implemented as software components that are executed and run on one or more processors (e.g., the controller/processor 280 of FIG. 2). Further, the transmission and reception of signals by the UE in operations 1100 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1100 begin, at 1102, by determining a value of a beta factor based on a priority level of UCI to be transmitted on a PUSCH. At 1104, the UE transmits the UCI on the PUSCH with transmit power determined based, at least in part, on the value of beta factor.

Figure 12:
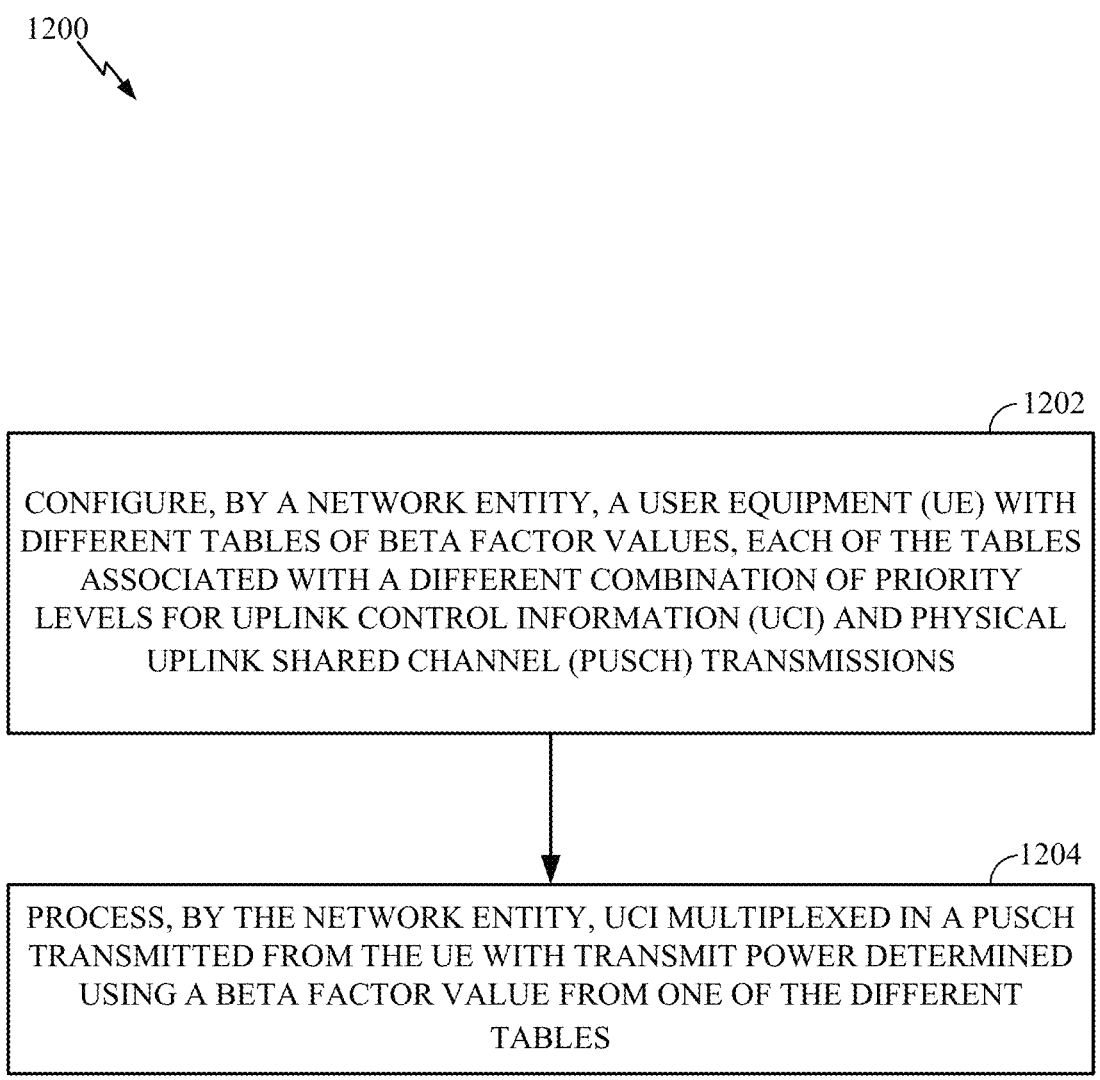
FIG. 12 is a flow diagram illustrating example operations for wireless communication by a network entity, in accordance with certain aspects of the present disclosure.

FIG. 12 is a flow diagram illustrating example operations 1200 that may be considered complementary to operations 1100 of FIG. 11. For example, the operations 11200 may be performed by a network entity (e.g., such as the BS 110a in the wireless communication network 100). The operations 1200 may be implemented as software components that are executed and run on one or more processors (e.g., the controller/processor 240 of FIG. 2). Further, the transmission and reception of signals by the BS in operations 1200 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 1200 begin, at 1202, by configuring a UE with different tables of beta factor values, each of the tables associated with a different combination of priority levels for UCI and PUSCH transmissions. At 1204, the network entity processes UCI multiplexed in a PUSCH transmitted from the UE with transmit power determined using a beta factor value from one of the different tables.

As noted above, in current systems, whenever there is data to be transmitted on PUSCH, the beta offset may be set to 1 when computing transmit power (e.g., irrespective of whether UCI is multiplexed or not). Aspects of the present disclosure provide alternate options, for example, when handling UL-SCH and UCI of differing priorities, as described above. According to one option, a (legacy) choice of beta offset could continue to be used when UL-SCH has a higher priority than UCI.

According to one option, when the UCI priority is equal to or greater than the priority of UL-SCH, the beta offset chosen for power control can be set to a value other than 1 (e.g., governed by $\beta_{offset}^{UCI}$ of the equation(s) shown and described above). In this case, a UCI-multiplexed payload can be transmitted at a higher power.

Figure 13:
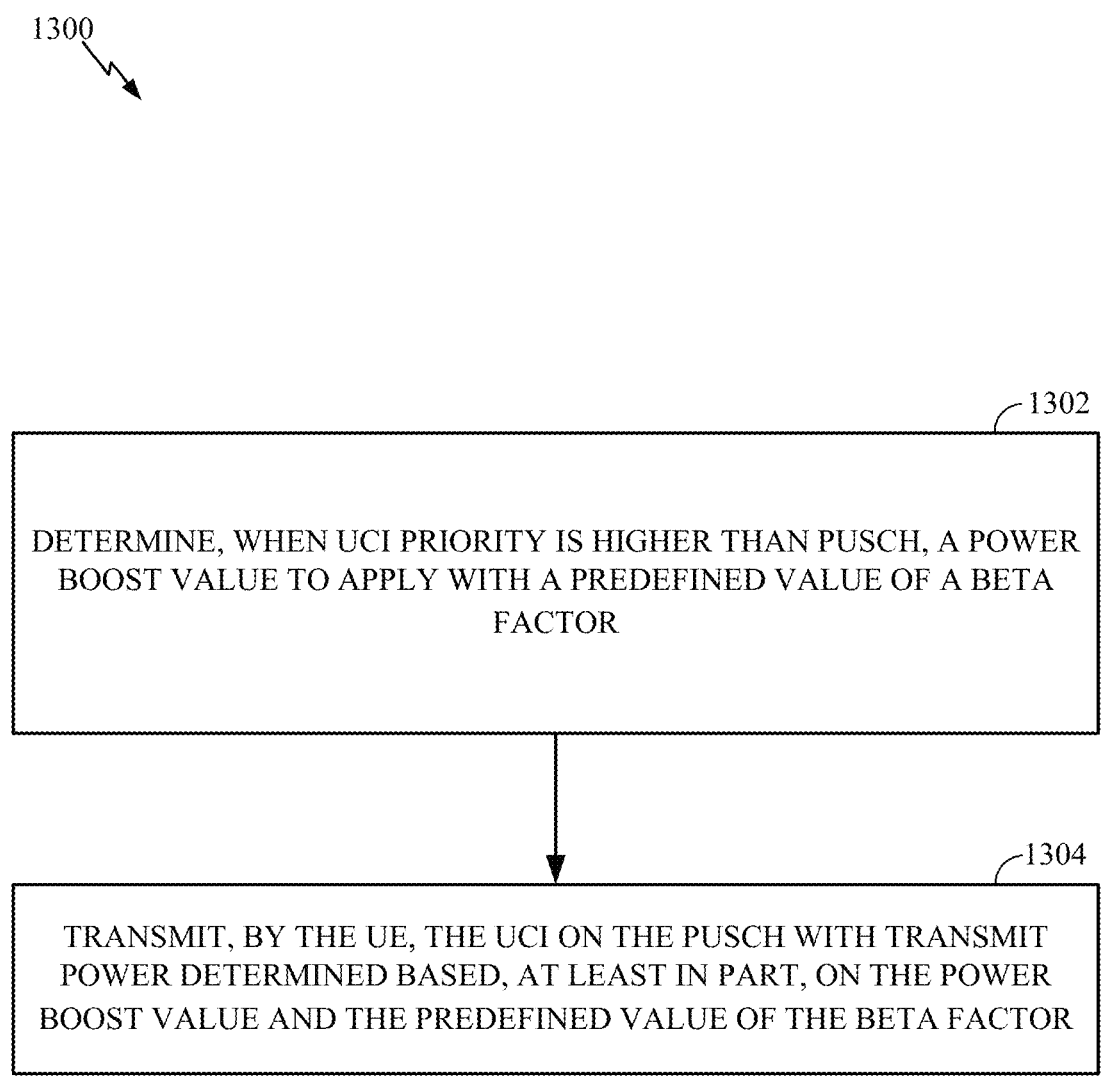
FIG. 13 is a flow diagram illustrating example operations for wireless communication by a UE, in accordance with certain aspects of the present disclosure.

According to one option, as illustrated in FIG. 13, when the UCI priority is greater than that of the PUSCH, the beta offset for power control can be set to a predefined value (e.g., 1), but the UE can determine an additional power boost to apply to the PUSCH (at 1302). The UE may then transmit the UCI on the PUSCH with transmit power determined based on the power boost value and the predefined value of the beta factor (at 1304). In this case, the power boost value may be selected (e.g., based on the beta offset for rate matching) from a set of power boost values. In some cases, the set of power boost values may be semi-statically configured. In such cases, one of the values from the set may be indicated dynamically, for example, via DCI (e.g., based on beta factor indicated via DCI).

As noted above, in some cases, how DMRS bundling is performed may take into account the possibility of certain PUSCH repetitions being sent with different transmit power levels (e.g., using priority based beta factors as described above).

Figure 14:
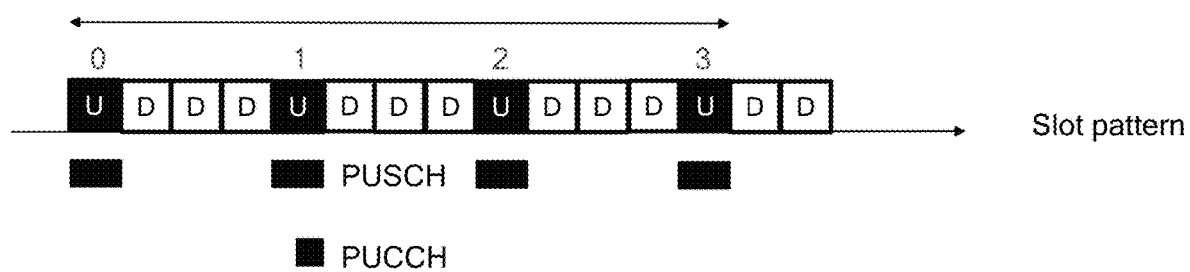
FIG. 14 is an example timeline illustrating a beta factor implemented during demodulated reference signal (DMRS) repetitions, in accordance with certain aspects of the present disclosure.

FIG. 14 is an example DMRS bundling timeline where transmit power (P2) for one PUSCH repetition (repetition 1) is different, by using a different beta factor (k) when UCI is multiplexed with PUSCH. For PUSCH repetitions 0, 2, and 3, a beta factor of 1 is used, resulting in transmit power of P1.

As described above, the beta offset is used based on whether the UCI is multiplexed. Because of this, the transmit power varies across the repetitions, and, if transmit power changes, phase continuity is lost. Thus, if a UE is to maintain phase continuity across repetitions, and if UCI is to be multiplexed, it may be prudent for the UE to decide whether to preserve DMRS bundling for joint channel estimation (JCE) and/or to prioritize the UCI transmission.

Accordingly, certain aspects provide techniques for coordinating/setting the beta offset based on which of DMRS and UCI is to be prioritized when UCI is to be multiplexed on an uplink data channel (e.g., PUSCH).

Figure 15:
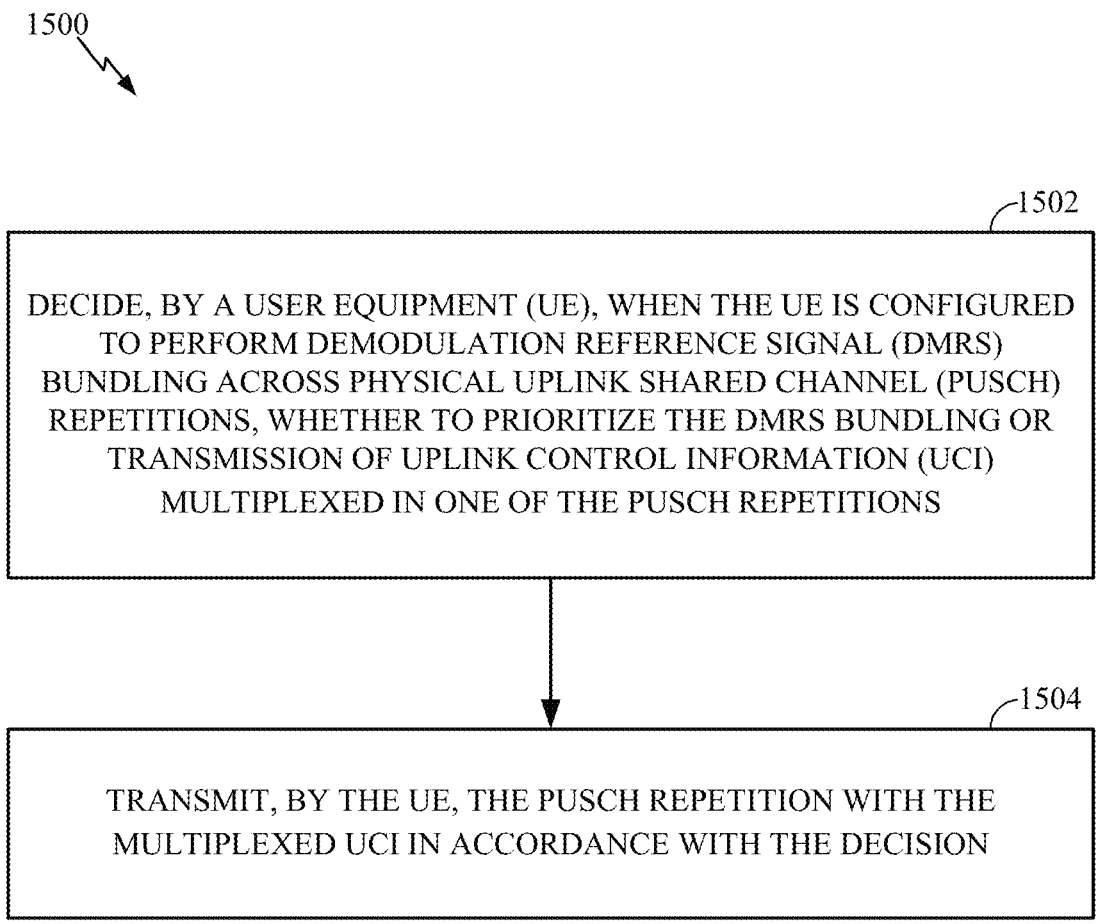
FIG. 15 is a flow diagram illustrating example operations for wireless communication by a UE, in accordance with certain aspects of the present disclosure.

FIG. 15 is a flow diagram illustrating example operations 1500 for wireless communication by a UE, in accordance with certain aspects of the present disclosure. The operations 1500 may be performed, for example, by the UE 120a in the wireless communication network 100. The operations 1500 may be implemented as software components that are executed and run on one or more processors (e.g., the controller/processor 280 of FIG. 2). Further, the transmission and reception of signals by the UE in operations 1500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1500 begin, at 1502, by deciding, when the UE is configured to perform DMRS bundling across PUSCH repetitions, whether to prioritize the DMRS bundling or transmission of UCI multiplexed in one of the PUSCH repetitions. At 1504, the UE transmit the PUSCH repetition with the multiplexed UCI in accordance with the decision.

Figure 16:
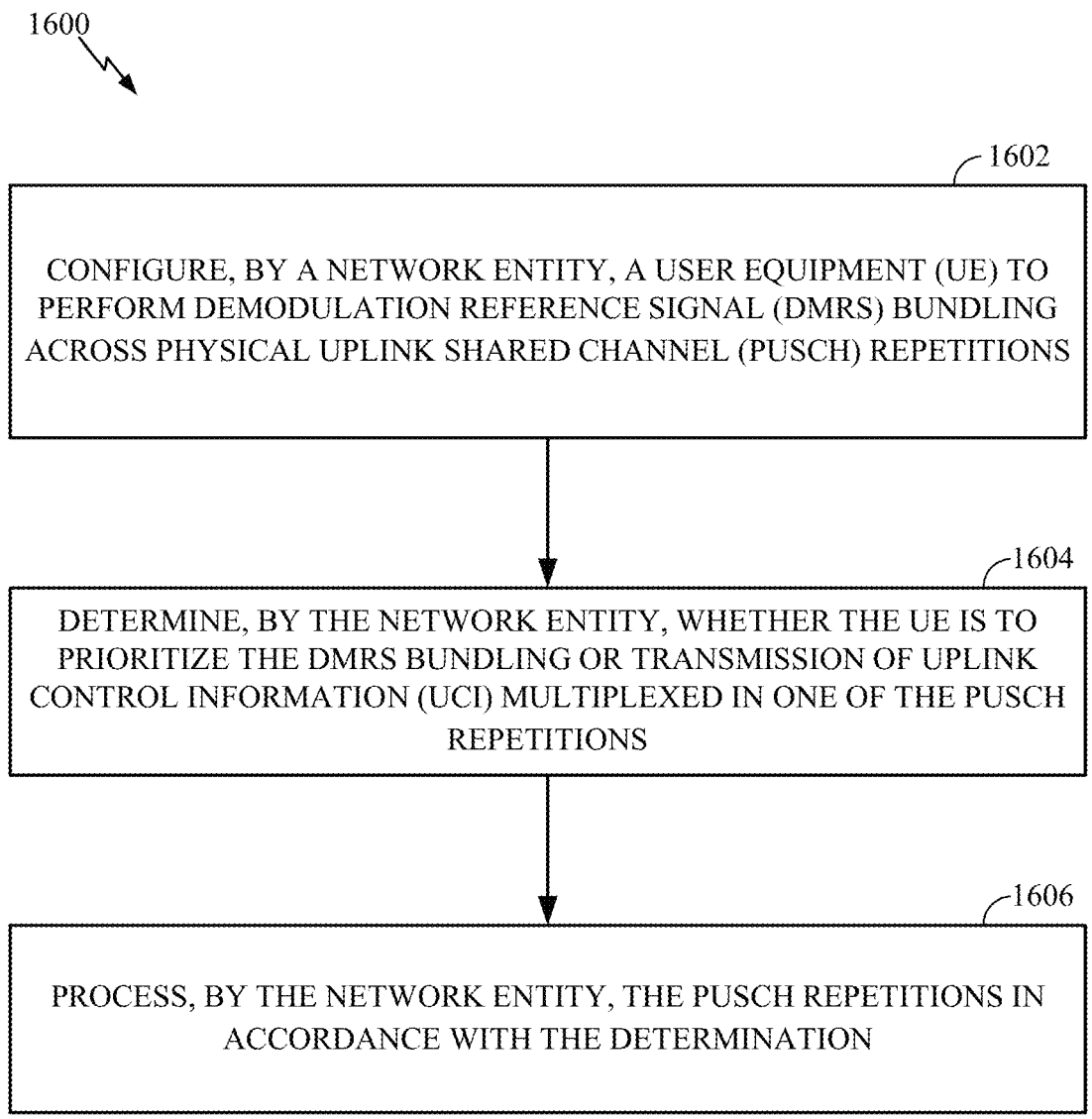
FIG. 16 is a flow diagram illustrating example operations for wireless communication by a network entity, in accordance with certain aspects of the present disclosure.

FIG. 16 is a flow diagram illustrating example operations 1600 that may be considered complementary to operations 1600 of FIG. 16. For example, the operations 1600 may be performed by a network entity (e.g., such as the BS 110a in the wireless communication network 100). The operations 1600 may be implemented as software components that are executed and run on one or more processors (e.g., the controller/processor 240 of FIG. 2). Further, the transmission and reception of signals by the BS in operations 1600 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 1600 begin, at 1602, by configuring a UE to perform DMRS bundling across PUSCH repetitions. At 1604, the network entity determines whether the UE is to prioritize the DMRS bundling or transmission of uplink control information (UCI) multiplexed in one of the PUSCH repetitions. At 1606, the network entity processes the PUSCH repetitions in accordance with the determination.

In certain aspects, DMRS bundling may be prioritized over the UCI transmission. If DMRS bundling is enabled, then the UE may set $\beta_{offset}$ to be 1 irrespective of whether UCI is multiplexed. In some cases, this technique may be considered equivalent to an intentional fallback to a legacy operation mode.

In certain aspects, the UCI may be prioritized over the DMRS bundling, and the UE may determine an appropriate beta offset to determine transmit power for a given slot where the UCI gets multiplexed with the UL-SCH. In this case, the DMRS bundling is terminated at least for the current slot.

In some case, once terminated, the DMRS bundling may not be resumed (e.g., permanently terminated). In other cases, DMRS bundling may be resumed, for example, during the next slot by starting a new bundle of the DMRS.

Example Wireless Communication Devices

Figure 17:
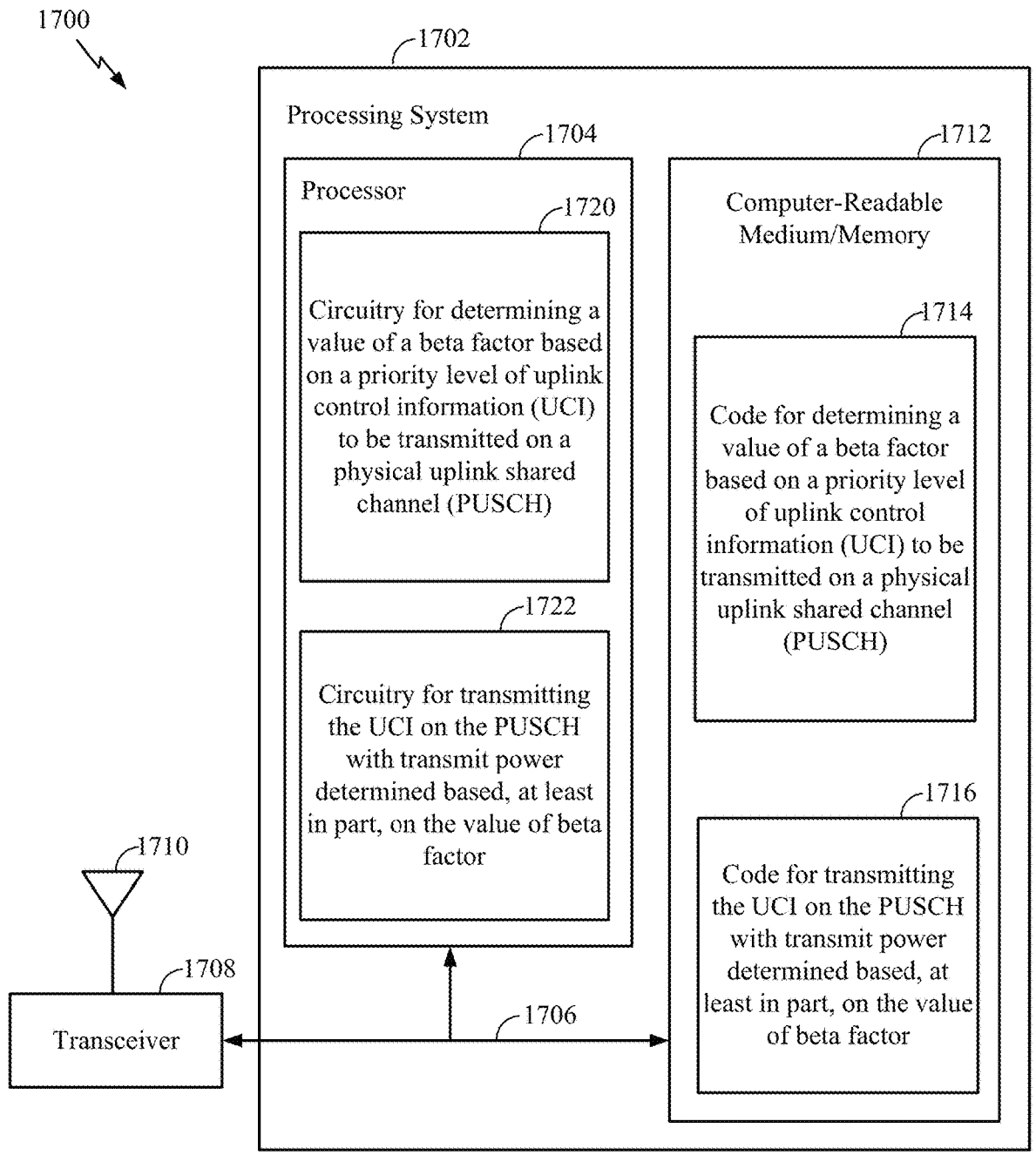
FIGS. 17-20 illustrate communications devices that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 11. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., a computer-executable code) that when executed by the processor 1704, cause the processor 1704 to perform the operations illustrated in FIG. 11, or other operations for performing the various techniques discussed herein. In certain aspects, computer-readable medium/memory 1712 stores code 1714 for determining a value of a beta factor based on a priority level of uplink control information (UCI) to be transmitted on a physical uplink shared channel (PUSCH); and code 1716 for transmitting the UCI on the PUSCH with transmit power determined based, at least in part, on the value of beta factor.

The processor 1704 may include circuitry configured to implement the code stored in the computer-readable medium/memory 1712, such as for performing the operations illustrated in FIG. 11, as well as other operations for performing the various techniques discussed herein. For example, the processor 1704 includes circuitry 1720 for determining a value of a beta factor based on a priority level of uplink control information (UCI) to be transmitted on a physical uplink shared channel (PUSCH); and circuitry 1722 for transmitting the UCI on the PUSCH with transmit power determined based, at least in part, on the value of beta factor.

Figure 18:
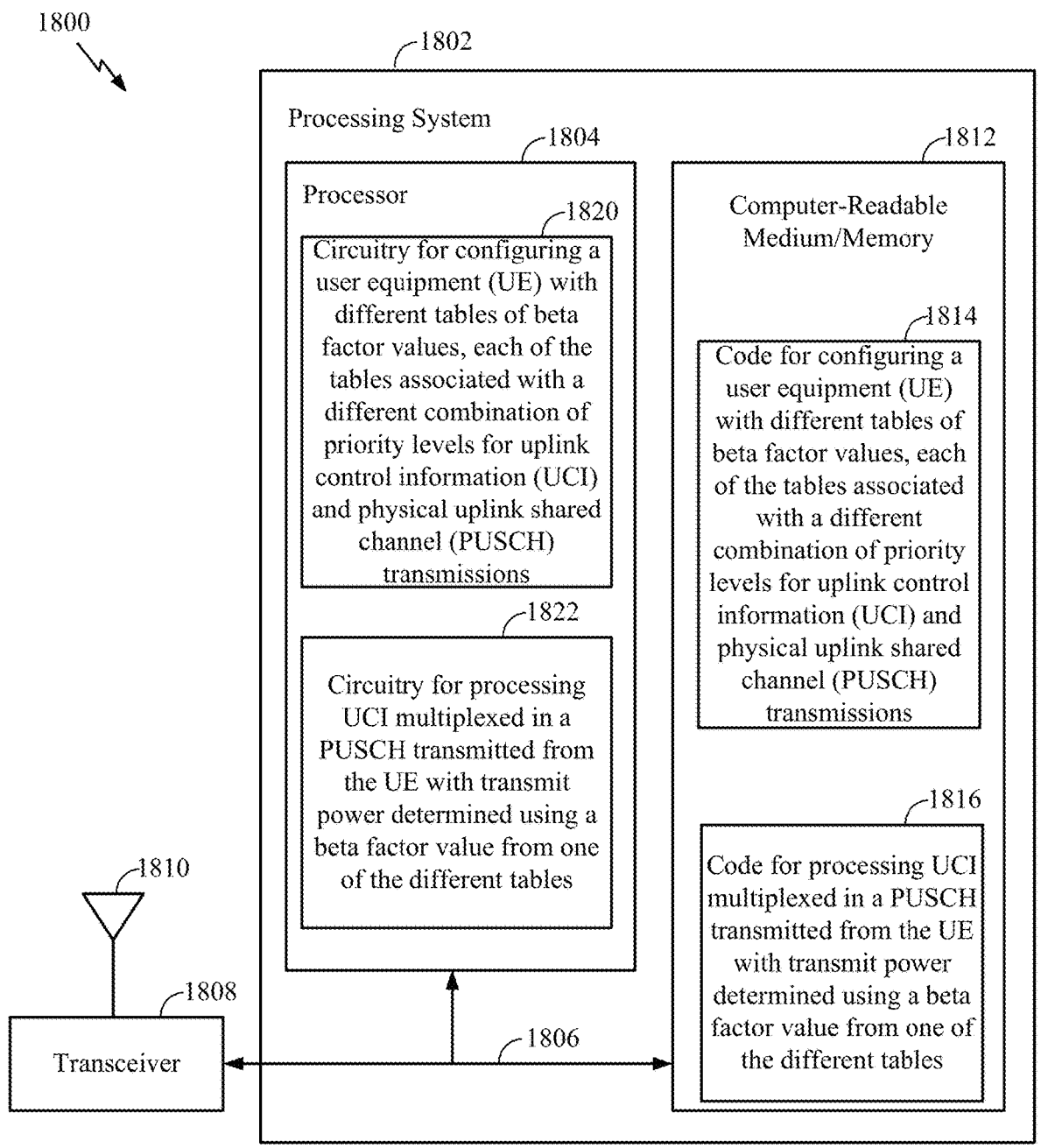

FIG. 18 illustrates a communications device 1800 that may include various components (e.g., corresponding to means-plus-function components) configured to perform operations for the techniques disclosed herein, such as the operations illustrated in FIG. 12. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 is configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/ memory 1812 is configured to store instructions (e.g., a computer-executable code) that when executed by the processor 1804, cause the processor 1804 to perform the operations illustrated in FIG. 12, or other operations for performing the various techniques discussed herein. In certain aspects, computer-readable medium/memory 1812 stores code 1814 for configuring a user equipment (UE) with different tables of beta factor values, each of the tables associated with a different combination of priority levels for uplink control information (UCI) and physical uplink shared channel (PUSCH) transmissions; and code 1816 for processing UCI multiplexed in a PUSCH transmitted from the UE with transmit power determined using a beta factor value from one of the different tables.

The processor 1804 may include circuitry configured to implement the code stored in the computer-readable medium/memory 1812, such as for performing the operations illustrated in FIG. 12, as well as other operations for performing the various techniques discussed herein. For example, the processor 1804 includes circuitry 1820 for configuring a user equipment (UE) with different tables of beta factor values, each of the tables associated with a different combination of priority levels for uplink control information (UCI) and physical uplink shared channel (PUSCH) transmissions; and circuitry 1822 for processing UCI multiplexed in a PUSCH transmitted from the UE with transmit power determined using a beta factor value from one of the different tables.

Figure 19:
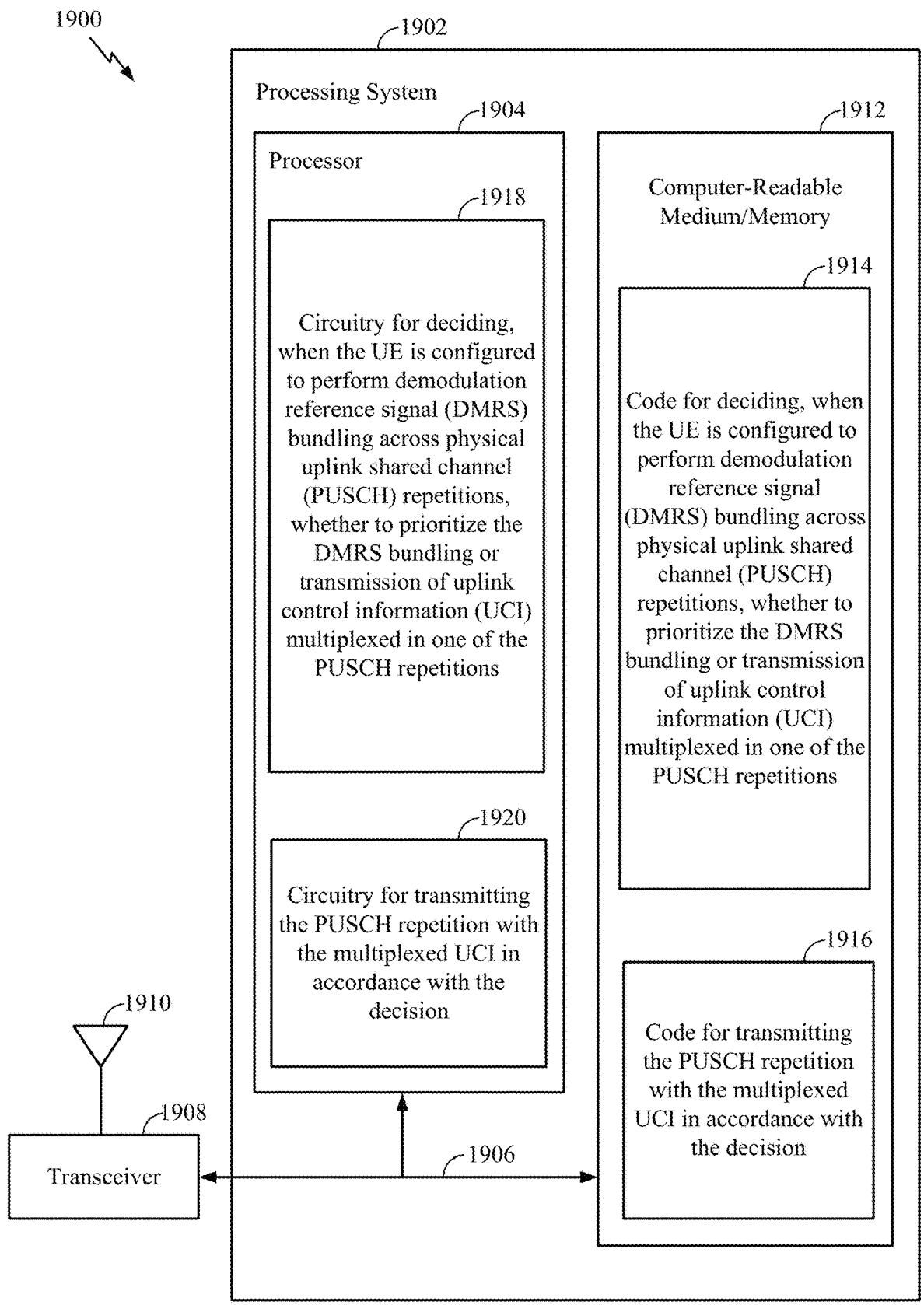

FIG. 19 illustrates a communications device 1900 that may include various components (e.g., corresponding to means-plus-function components) configured to perform operations for the techniques disclosed herein, such as the operations illustrated in FIG. 14. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 is configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/ memory 1912 is configured to store instructions (e.g., a computer-executable code) that when executed by the processor 1904, cause the processor 1904 to perform the operations illustrated in FIG. 14, or other operations for performing the various techniques discussed herein. In certain aspects, computer-readable medium/memory 1912 stores code 1914 for deciding, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and code 1916 for transmitting the PUSCH repetition with the multiplexed UCI in accordance with the decision.

The processor 1904 may include circuitry configured to implement the code stored in the computer-readable medium/memory 1912, such as for performing the operations illustrated in FIG. 14, as well as other operations for performing the various techniques discussed herein. For example, the processor 1904 includes circuitry 1918 for deciding, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and circuitry 1920 for transmitting the PUSCH repetition with the multiplexed UCI in accordance with the decision.

Figure 20:
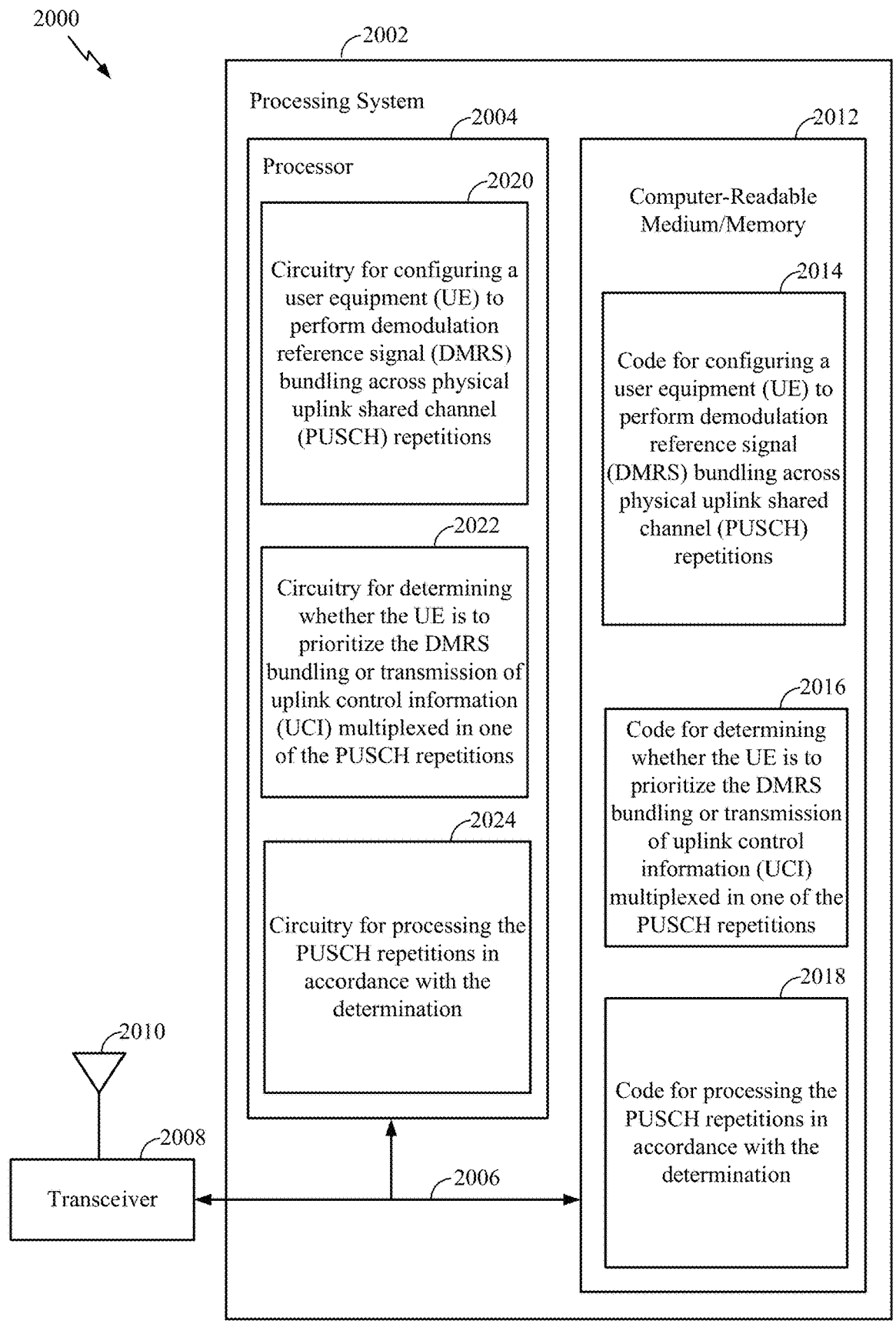

FIG. 20 illustrates a communications device 2000 that may include various components (e.g., corresponding to means-plus-function components) configured to perform operations for the techniques disclosed herein, such as the operations illustrated in FIG. 16. The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 is configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/ memory 2012 is configured to store instructions (e.g., a computer-executable code) that when executed by the processor 2004, cause the processor 2004 to perform the operations illustrated in FIG. 16, or other operations for performing the various techniques discussed herein. In certain aspects, computer-readable medium/memory 2012 stores code 2014 for configuring a user equipment (UE) to perform demodulation reference signal (DMRS) bundling across physical uplink shared channel (PUSCH) repetitions; code 2016 for determining whether the UE is to prioritize the DMRS bundling or transmission of uplink control information (UCI) multiplexed in one of the PUSCH repetitions; and code 2018 for processing the PUSCH repetitions in accordance with the determination.

The processor 2004 may include circuitry configured to implement the code stored in the computer-readable medium/memory 2012, such as for performing the operations illustrated in FIG. 16, as well as other operations for performing the various techniques discussed herein. For example, the processor 2004 includes circuitry 2020 for configuring a user equipment (UE) to perform demodulation reference signal (DMRS) bundling across physical uplink shared channel (PUSCH) repetitions; circuitry 2022 for determining whether the UE is to prioritize the DMRS bundling or transmission of uplink control information (UCI) multiplexed in one of the PUSCH repetitions; and circuitry 2024 for processing the PUSCH repetitions in accordance with the determination.

EXAMPLE ASPECTS

Aspect 1. A method for wireless communications by a user equipment (UE), comprising determining a value of a beta factor based on a priority level of uplink control information (UCI) to be transmitted on a physical uplink shared channel (PUSCH); and transmitting the UCI on the PUSCH with transmit power determined based, at least in part, on the value of beta factor.

Aspect 2. The method of Aspect 1, further comprising determining a number of resource elements (REs) for the UCI.

Aspect 3. The method of Aspect 1 or 2, wherein the value of the beta factor is further based on at least one of: a type of the UCI or a priority level of the PUSCH.

Aspect 4. The method of Aspect 3, further comprising receiving signaling configuring the UE with different tables of beta factor values, each of the tables associated with a different combination of priority levels for the UCI and PUSCH; and the value of the beta factor is obtained from one of the tables that is selected based on the priority levels of the UCI and the PUSCH.

Aspect 5. The method of Aspect 4, wherein each of the tables has different entries, each entry having different beta factor values for different types and sizes of UCI.

Aspect 6. The method of Aspect 5, wherein the value of the beta factor is obtained from an entry in the selected table determined based on a plurality of bits indicated in a downlink control information (DCI) scheduling the PUSCH.

Aspect 7. The method of any of Aspects 3-6, wherein the priority levels of the UCI and PUSCH are indicated via at least one of: radio resource control (RRC) or downlink control information (DCI) signaling.

Aspect 8. The method of any of Aspects 1-7, wherein, if the PUSCH has a higher priority level greater than the UCI, the UE uses a beta factor value of one when data is transmitted on the PUSCH.

Aspect 9. The method of any of Aspects 1-8, wherein, if the UCI has a higher priority level greater than or equal to the PUSCH, the UE uses a beta factor value greater than one.

Aspect 10. The method of any of Aspects 1-9, wherein, if the UCI has a higher priority level greater than or equal to the PUSCH, the UE uses a beta factor value of one and a power boost value selected from a set of power boost values.

Aspect 11. The method of any of Aspects 1-10, further comprising, if the UE is configured to perform demodulation reference signal (DMRS) bundling across PUSCH repetitions including the PUSCH, deciding whether to prioritize the DMRS bundling or the UCI transmission.

Aspect 12. The method of Aspect 11, wherein the UE is configured to prioritize DMRS bundling by using a same beta factor value across the PUSCH repetitions.

Aspect 13. The method of Aspect 11 or 12, wherein the UE is configured to prioritize UCI bundling by using the determined value of the beta factor; and terminate the DMRS bundling.

Aspect 14. The method of Aspect 13, further comprising resuming the DMRS bundling in a subsequent slot by starting a new DMRS bundle.

Aspect 15. A method for wireless communications by a user equipment (UE), comprising deciding, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and transmitting the PUSCH repetition with the multiplexed UCI in accordance with the decision.

Aspect 16. The method of Aspect 15, wherein the UE is configured to prioritize DMRS bundling by using a same beta factor value across the PUSCH repetitions.

Aspect 17. The method of Aspect 15 or 16, wherein the UE is configured to prioritize UCI bundling by using a beta factor value determined based on a priority level of the UCI.

Aspect 18. The method of Aspect 17, further comprising terminating the DMRS bundling.

Aspect 19. The method of Aspect 18, further comprising resuming the DMRS bundling in a subsequent slot by starting a new DMRS bundle.

Aspect 20. The method of any of Aspects 17-19, wherein the value of the beta factor is further based on at least one of: a type of the UCI or a priority level of the PUSCH.

Aspect 21. A method for wireless communications by a network entity, comprising configuring a user equipment (UE) with different tables of beta factor values, each of the tables associated with a different combination of priority levels for uplink control information (UCI) and physical uplink shared channel (PUSCH) transmissions; and processing UCI multiplexed in a PUSCH transmitted from the UE with transmit power determined using a beta factor value from one of the different tables.

Aspect 22. The method of Aspect 21, further comprising configuring the UE with a number of resource elements (REs) for the UCI.

Aspect 23. The method of Aspect 21 or 22, wherein the value of the beta factor is further based on at least one of: a type of the UCI or a priority level of the PUSCH.

Aspect 24. The method of Aspect 23, further comprising configuring the UE with different tables of beta factor values, each of the tables associated with a different combination of priority levels for the UCI and PUSCH, wherein the value of the beta factor is obtained from one of the tables that is selected based on the priority levels of the UCI and the PUSCH.

Aspect 25. The method of Aspect 24, wherein each of the tables has different entries, each entry having different beta factor values for different types and sizes of UCI.

Aspect 26. The method of Aspect 25, wherein the value of the beta factor is obtained from an entry in the selected table determined based on a plurality of bits indicated in a downlink control information (DCI) scheduling the PUSCH.

Aspect 27. The method of any of Aspects 23-26, wherein the priority levels of the UCI and PUSCH are indicated via at least one of: radio resource control (RRC) or downlink control information (DCI) signaling.

Aspect 28. The method of any of Aspects 21-27, wherein, if the PUSCH has a higher priority level greater than the UCI, the UE uses a beta factor value of one when data is transmitted on the PUSCH.

Aspect 29. The method of any of Aspects 21-28, wherein, if the UCI has a higher priority level greater than or equal to the PUSCH, the UE uses a beta factor value greater than one.

Aspect 30. The method of any of Aspects 21-29, wherein, if the UCI has a higher priority level greater than or equal to the PUSCH, the UE uses a beta factor value of one and a power boost value selected from a set of power boost values.

Aspect 31. The method of any of Aspects 21-30, further comprising, if the UE is configured to perform demodulation reference signal (DMRS) bundling across PUSCH repetitions including the PUSCH, configuring the UE to prioritize the DMRS bundling or the UCI transmission.

Aspect 32. The method of Aspect 31, wherein the UE is configured to prioritize DMRS bundling by using a same beta factor value across the PUSCH repetitions.

Aspect 33. The method of Aspect 31, wherein the UE is configured to prioritize UCI bundling by using the determined value of the beta factor; and terminate the DMRS bundling.

Aspect 34. The method of Aspect 33, further comprising resuming processing the DMRS bundling in a subsequent slot by starting a new DMRS bundle.

Aspect 35. A method for wireless communications by a network entity, comprising configuring a user equipment (UE) to perform demodulation reference signal (DMRS) bundling across physical uplink shared channel (PUSCH) repetitions; determining whether the UE is to prioritize the DMRS bundling or transmission of uplink control information (UCI) multiplexed in one of the PUSCH repetitions; and processing the PUSCH repetitions in accordance with the determination.

Aspect 36. The method of Aspect 35, further comprising configuring the UE to prioritize DMRS bundling by using a same beta factor value across the PUSCH repetitions.

Aspect 37. The method of Aspect 35 or 36, further comprising configuring the UE to prioritize UCI bundling by using a beta factor value determined based on a priority level of the UCI.

Aspect 38. The method of Aspect 37, further comprising terminating processing the DMRS bundling.

Aspect 39. The method of Aspect 38, further comprising resuming processing the DMRS bundling in a subsequent slot by starting a new DMRS bundle.

Aspect 40. The method of any of Aspects 37-39, wherein the value of the beta factor is further based on at least one of: a type of the UCI or a priority level of the PUSCH.

Aspect 41: An apparatus, comprising: a memory comprising executable instructions; and one or more processors configured to execute the executable instructions and cause the apparatus to perform a method in accordance with any one of Aspects 1-40.

Aspect 42: An apparatus, comprising means for performing a method in accordance with any one of Aspects 1-40.

Aspect 43: A non-transitory computer-readable medium comprising executable instructions that, when executed by one or more processors of an apparatus, cause the apparatus to perform a method in accordance with any one of Aspects 1-40.

Aspect 44: A computer program product embodied on a computer-readable storage medium comprising code for performing a method in accordance with any one of Aspects 1-40.

Aspect 45. An apparatus for wireless communications by a user equipment (UE), comprising at least one processor and a memory configured to determine a value of a beta factor based on a priority level of uplink control information (UCI) to be transmitted on a physical uplink shared channel (PUSCH); and transmit the UCI on the PUSCH with transmit power determined based, at least in part, on the value of beta factor.

Aspect 46. The apparatus of Aspect 45, wherein the at least one processor and memory are further configured to determine a number of resource elements (REs) for the uplink control information (UCI).

Aspect 47. The apparatus of Aspect 45 or 46, wherein the value of the beta factor is further based on at least one of: a type of the UCI or a priority level of the PUSCH.

Aspect 48. The apparatus of Aspect 47, wherein the at least one processor and memory are further configured to receive signaling configuring the UE with different tables of beta factor values, each of the tables associated with a different combination of priority levels for the UCI and PUSCH; and the value of the beta factor is obtained from one of the tables that is selected based on the priority levels of the UCI and the PUSCH.

Aspect 49. The apparatus of Aspect 48, wherein each of the tables has different entries, each entry having different beta factor values for different types and sizes of UCI.

Aspect 50. The apparatus of Aspect 49, wherein the value of the beta factor is obtained from an entry in the selected table determined based on a plurality of bits indicated in a downlink control information (DCI) scheduling the PUSCH.

Aspect 51. The apparatus of any of Aspects 45-50, the at least one processor and memory are further configured to, if the UE is configured to perform demodulation reference signal (DMRS) bundling across PUSCH repetitions including the PUSCH, decide whether to prioritize the DMRS bundling or the UCI transmission.

Aspect 52. An apparatus for wireless communications by a user equipment (UE), comprising at least one processor and a memory configured to decide, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and transmit the PUSCH repetition with the multiplexed UCI in accordance with the decision.

Aspect 53. The apparatus of Aspect 52, wherein the UE is configured to prioritize DMRS bundling by using a same beta factor value across the PUSCH repetitions.

Aspect 54. The apparatus of Aspect 52 or 53, wherein the UE is configured to prioritize UCI bundling by using a beta factor value determined based on a priority level of the UCI.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 11, 12, 13, 15, and 16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   determining a value of a beta factor based on a priority level of uplink control information (UCI) to be transmitted on a physical uplink shared channel (PUSCH), wherein, if the PUSCH has a priority level greater than the UCI, the UE uses a beta factor value of one when data is transmitted on the PUSCH, or
   wherein, if the UCI has a priority level greater than or equal to the PUSCH:
      the UE uses a beta factor value greater than one, or the UE uses a beta factor value of one and a power boost value selected from a set of power boost values; and
   transmitting the UCI on the PUSCH with transmit power determined based, at least in part, on the value of the beta factor.

2. The method of claim 1, further comprising determining a number of resource elements (REs) for the uplink control information (UCI).

3. The method of claim 1, wherein the value of the beta factor is further based on at least one of: a type of the UCI or a priority level of the PUSCH.

4. The method of claim 3, further comprising:
   receiving signaling configuring the UE with different tables of beta factor values, each of the tables associated with a different combination of priority levels for the UCI and PUSCH; and
   the value of the beta factor is obtained from one of the tables that is selected based on the priority levels of the UCI and the PUSCH.

5. The method of claim 4, wherein each of the tables has different entries, each entry having different beta factor values for different types and sizes of UCI.

6. The method of claim 5, wherein the value of the beta factor is obtained from an entry in the selected table determined based on a plurality of bits indicated in a downlink control information (DCI) scheduling the PUSCH.

7. The method of claim 3, wherein the priority levels of the UCI and PUSCH are indicated via at least one of: radio resource control (RRC) or downlink control information (DCI) signaling.

8. The method of claim 1, further comprising, if the UE is configured to perform demodulation reference signal (DMRS) bundling across PUSCH repetitions including the PUSCH, deciding whether to prioritize the DMRS bundling or the UCI transmission.

9. The method of claim 8, wherein the UE is configured to prioritize DMRS bundling by using a same beta factor value across the PUSCH repetitions.

10. The method of claim 8, wherein the UE is configured to:
    prioritize UCI bundling by using the determined value of the beta factor; and
    terminate the DMRS bundling.

11. The method of claim 10, further comprising resuming the DMRS bundling in a subsequent slot by starting a new DMRS bundle.

12. A method for wireless communications by a user equipment (UE), comprising:
    deciding, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and
    transmitting the PUSCH repetition with the multiplexed UCI in accordance with the decision.

13. The method of claim 12, wherein the UE is configured to prioritize DMRS bundling by using a same beta factor value across the PUSCH repetitions.

14. The method of claim 12, wherein the UE is configured to prioritize UCI bundling by using a beta factor value determined based on a priority level of the UCI.

15. The method of claim 14, further comprising terminating the DMRS bundling.

16. The method of claim 15, further comprising resuming the DMRS bundling in a subsequent slot by starting a new DMRS bundle.

17. The method of claim 14, wherein the value of the beta factor is further based on at least one of: a type of the UCI or a priority level of the PUSCH.

18. An apparatus for wireless communications by a user equipment (UE), comprising:
    at least one processor and a memory configured to
    determine a value of a beta factor based on a priority level of uplink control information (UCI) to be transmitted on a physical uplink shared channel (PUSCH),
       wherein, if the PUSCH has a priority level greater than the UCI, the UE uses a beta factor value of one when data is transmitted on the PUSCH, or
       wherein, if the UCI has a priority level greater than or equal to the PUSCH:
    the UE uses a beta factor value greater than one, or the UE uses a beta factor value of one and a power boost value selected from a set of power boost values; and transmit the UCI on the PUSCH with transmit power determined based, at least in part, on the value of the beta factor.

19. The apparatus of claim 18, wherein the at least one processor and memory are further configured to determine a number of resource elements (REs) for the uplink control information (UCI).

20. The apparatus of claim 18, wherein the value of the beta factor is further based on at least one of: a type of the UCI or a priority level of the PUSCH.

21. The apparatus of claim 20, wherein:
the at least one processor and memory are further configured to receive signaling configuring the UE with different tables of beta factor values, each of the tables associated with a different combination of priority levels for the UCI and PUSCH; and
the value of the beta factor is obtained from one of the tables that is selected based on the priority levels of the UCI and the PUSCH.

22. The apparatus of claim 21, wherein each of the tables has different entries, each entry having different beta factor values for different types and sizes of UCI.

23. The apparatus of claim 22, wherein the value of the beta factor is obtained from an entry in the selected table determined based on a plurality of bits indicated in a downlink control information (DCI) scheduling the PUSCH.

24. The apparatus of claim 18, the at least one processor and memory are further configured to, if the UE is configured to perform demodulation reference signal (DMRS) bundling across PUSCH repetitions including the PUSCH, decide whether to prioritize the DMRS bundling or the UCI transmission.

25. An apparatus for wireless communications by a user equipment (UE), comprising:
at least one processor and a memory configured to
decide, when the UE is configured to perform demodulation reference signal (DMRS) bundling across physical uplink shared channel (PUSCH) repetitions, whether to prioritize the DMRS bundling or transmission of uplink control information (UCI) multiplexed in one of the PUSCH repetitions; and
transmit the PUSCH repetition with the multiplexed UCI in accordance with the decision.

26. The apparatus of claim 25, wherein the UE is configured to prioritize DMRS bundling by using a same beta factor value across the PUSCH repetitions.

27. The apparatus of claim 25, wherein the UE is configured to prioritize UCI bundling by using a beta factor value determined based on a priority level of the UCI.

* * * * *